(12) United States Patent
Chen

(10) Patent No.: US 8,573,880 B2
(45) Date of Patent: Nov. 5, 2013

(54) FITTING SUITE

(75) Inventor: Johnson Chen, Mercer Island, WA (US)

(73) Assignee: Johnson Chen, Mercer Island, WA (US)

( * ) Notice: Subject to any disclaimer, the term of this patent is extended or adjusted under 35 U.S.C. 154(b) by 0 days.

(21) Appl. No.: 13/337,454

(22) Filed: Dec. 27, 2011

(65) Prior Publication Data

US 2012/0099924 A1    Apr. 26, 2012

Related U.S. Application Data

(63) Continuation-in-part of application No. 12/577,721, filed on Oct. 13, 2009, now abandoned.

(30) Foreign Application Priority Data

Jun. 25, 2009   (TW) ................................ 98211487 U

(51) Int. Cl.
*F16B 2/18*       (2006.01)

(52) U.S. Cl.
USPC ........................................ 403/331; 403/409.1

(58) Field of Classification Search
USPC ................ 403/231, 245, 188, 331, 353, 360, 403/374.1, DIG. 10, DIG. 11, DIG. 13, 107, 403/408.1, 409.1; 108/193, 147.16; 312/257.1, 108, 111, 263, 265.5
See application file for complete search history.

(56) References Cited

U.S. PATENT DOCUMENTS

| | | | | |
|---|---|---|---|---|
| 3,295,474 A | * | 1/1967 | Ornstein | 108/152 |
| 3,451,362 A | * | 6/1969 | Welch et al. | 108/60 |
| 3,491,820 A | * | 1/1970 | Ostling | 52/796.1 |
| 3,596,940 A | | 8/1971 | Horwitt et al. | 403/230 |
| 3,596,942 A | * | 8/1971 | Zoebelein | 403/230 |
| 3,634,983 A | * | 1/1972 | Welch | 52/27.5 |
| 3,645,162 A | * | 2/1972 | Welch | 411/339 |
| 3,869,992 A | * | 3/1975 | Kramer | 108/60 |
| 3,894,377 A | * | 7/1975 | Welch | 52/584.1 |
| 3,993,377 A | * | 11/1976 | Montroy | 312/263 |
| 3,996,718 A | * | 12/1976 | Welch | 312/111 |
| 4,460,147 A | * | 7/1984 | Macbain | 248/542 |
| 4,470,716 A | * | 9/1984 | Welch | 403/254 |
| 4,587,788 A | * | 5/1986 | Bielicki | 52/698 |

(Continued)

FOREIGN PATENT DOCUMENTS

| | | |
|---|---|---|
| CN | 2148851 Y | 12/1993 |
| CN | 2274916 | 2/1998 |

(Continued)

OTHER PUBLICATIONS

California Closets, Solutions—Bedroom: Wardrobe, copyright 2010, printed Oct. 13, 2011 (2 pages).

(Continued)

*Primary Examiner* — Joshua Kennedy

(74) *Attorney, Agent, or Firm* — Johnson Chen

(57) ABSTRACT

A fitting suite for connecting a first board and a second board includes a wedge and at least one fitting. The fitting has a locking pin coupled with the first board and a fitting head spaced from the first board. The wedge has a mounting coupled with the second board and a fork spaced from the second board. The fork is detachably secured with the fitting. Thus, the fitting head is clamped by the fork and the second board, and the fork is clamped by the fitting head and the first board.

20 Claims, 24 Drawing Sheets

(56) References Cited

U.S. PATENT DOCUMENTS

| | | | |
|---|---|---|---|
| 5,836,121 | A | 11/1998 | Hofman |
| 6,082,838 | A * | 7/2000 | Bissu-Palombo ............. 312/195 |
| 6,419,330 | B1 * | 7/2002 | Lechman ...................... 312/194 |
| 6,588,971 | B2 * | 7/2003 | Welch et al. .................. 403/388 |
| 7,004,436 | B2 * | 2/2006 | Knapp ..................... 248/220.22 |
| 7,959,391 | B2 * | 6/2011 | Lien ............................. 411/133 |
| 2010/0329779 | A1 | 12/2010 | Chen |

FOREIGN PATENT DOCUMENTS

| | | |
|---|---|---|
| CN | 2627269 | 2/2004 |
| CN | 201065739 Y | 5/2008 |
| CN | 201480610 U | 5/2010 |
| CN | 102562737 A | 7/2012 |
| TW | M 269779 | 7/2005 |
| TW | M 325026 | 1/2008 |
| TW | M 369707 | 12/2009 |
| WO | WO 2006/038244 | 4/2006 |

OTHER PUBLICATIONS

California Closets, Solutions—Bedroom: Walk-in, copyright 2010, printed Oct. 13, 2011 (2 pages).

Closets by Design, http://www.closetsbydesign.com/bedroom, copyright 2011, (2 pages).

The Custom Closet Company, The Pacific Northwest's Trusted Source for Home Organization, http://www.thecustomclosetcompany.com/bedroom.asp, copyright 1999-2008 (1 pg.).

EasyClosets.com, Closet System Installation Instructions, EasyClosets.com—Version 0709, copyright 2009 (36 pages).

Closet Storage, Shelf Organizers & Drawer Liners at The Home Depot, http://www.homedepot.com/Storage-Organization-Closet-Storage/h_d1/N-5yclvZaqud/h, copyright 2000-2011 (4 pgs.).

Small space Walk-in closet room divider—IKEA, http://www.ikea.com/ms/en_US/rooms_ideas/small_spaces/walk_incloset_room_divider . . . copyright 1999-2011 (4 pgs.).

Closet Organizers Seattle, Closet Systems Bellevue, Closets Auburn—AAA KARTAK, http://www.fasterandbetter.com/closets.php, copyright 2011 AAA LARTAL (1 pg.).

Kitchen Craft, KitchenCraftCabinetary, http://www.kitchencraft.com, printed Oct. 13, 2011 (1 pg.).

Closet Organization at Lowe's: Hampers, Tie Racks, Wire Closet Organizer, http://www.lowes.com/pl.Closet+Organization_4294857752_4294937087_?cm_cr=Stor . . . copyright 2011 Lowe's Companies, Inc. (2 pgs.).

Canyon Creek Cabinet Company, http://www.canyoncreek.com/, copyright 2011 (1 pg.).

* cited by examiner

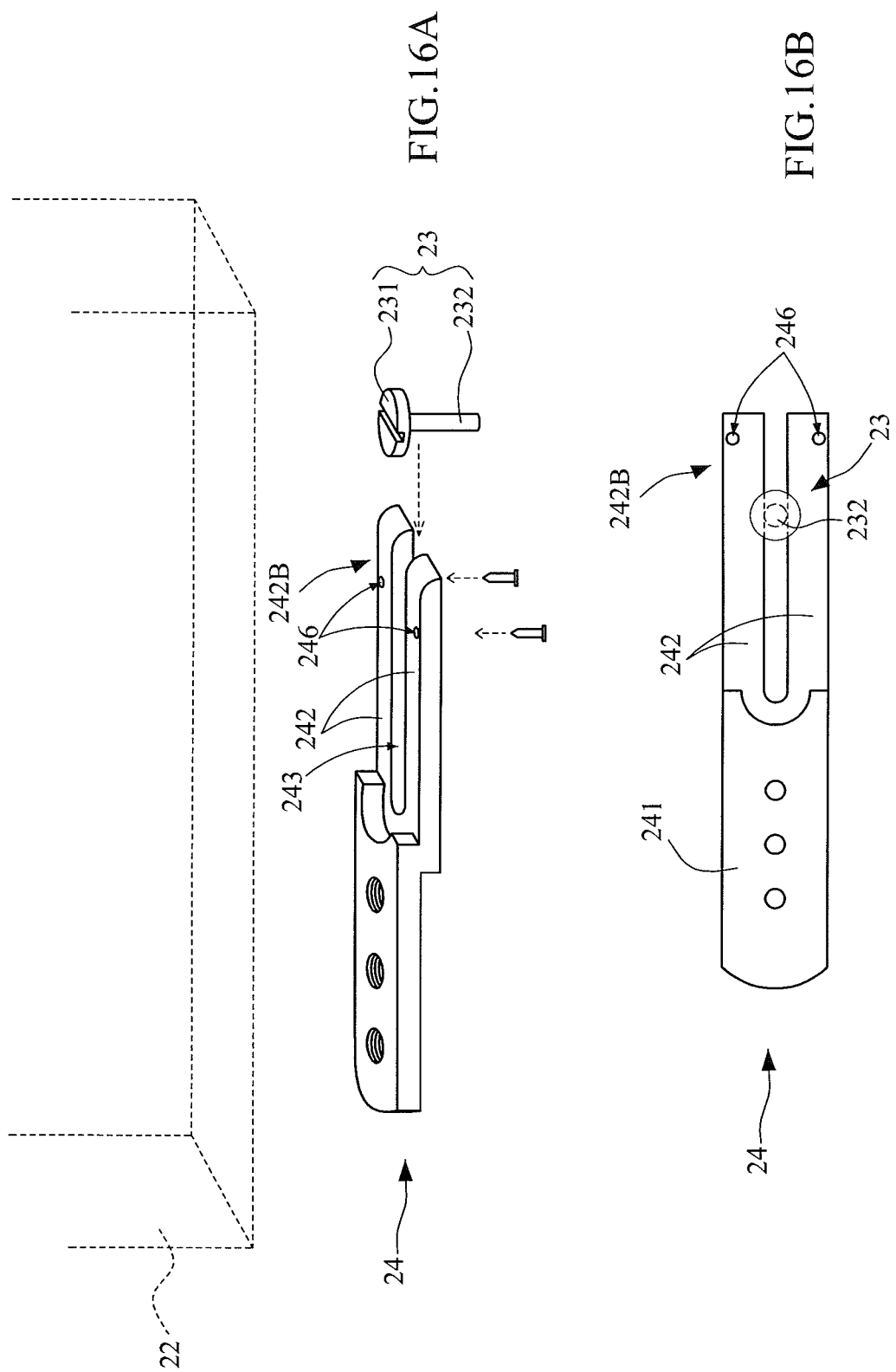

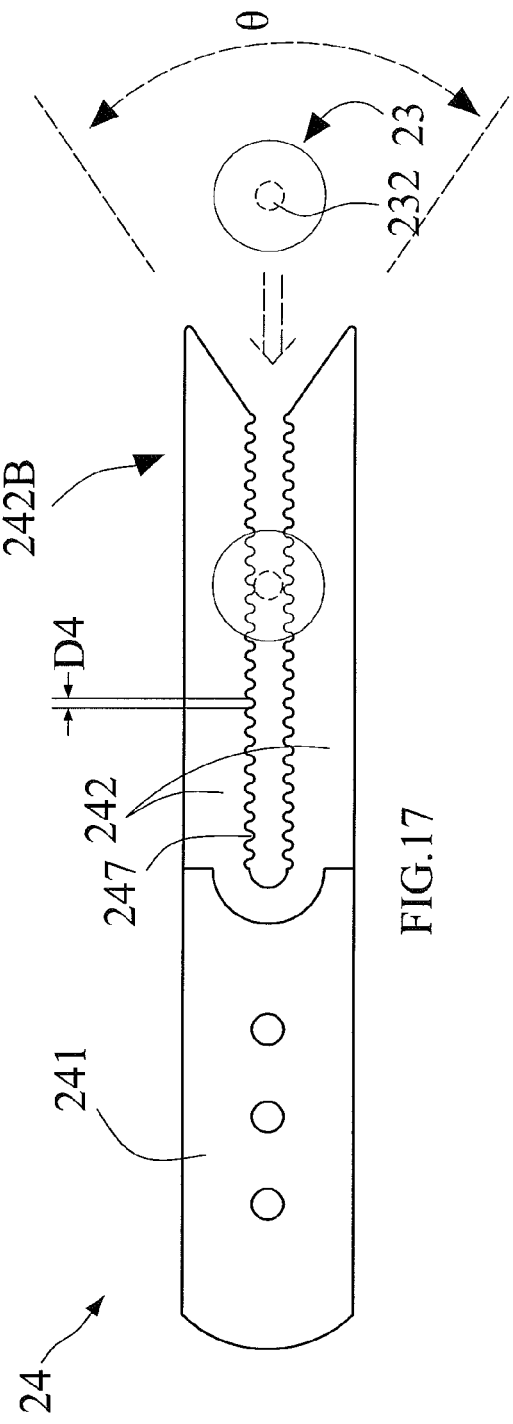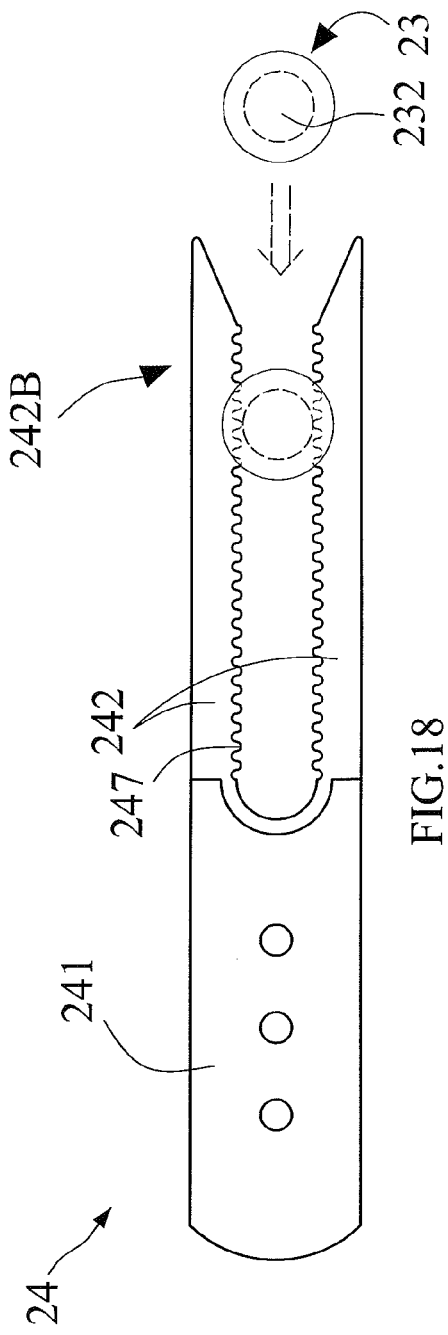

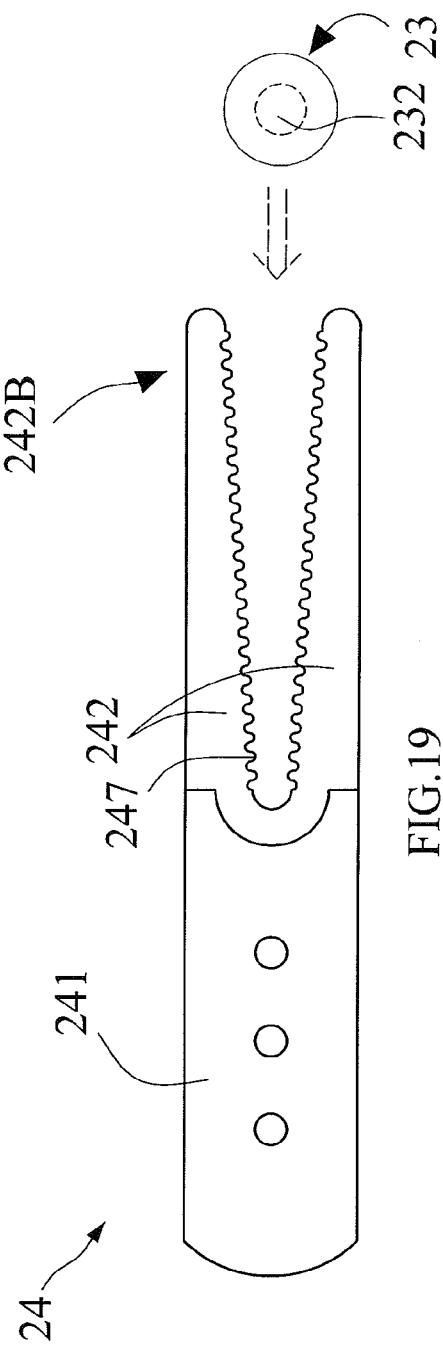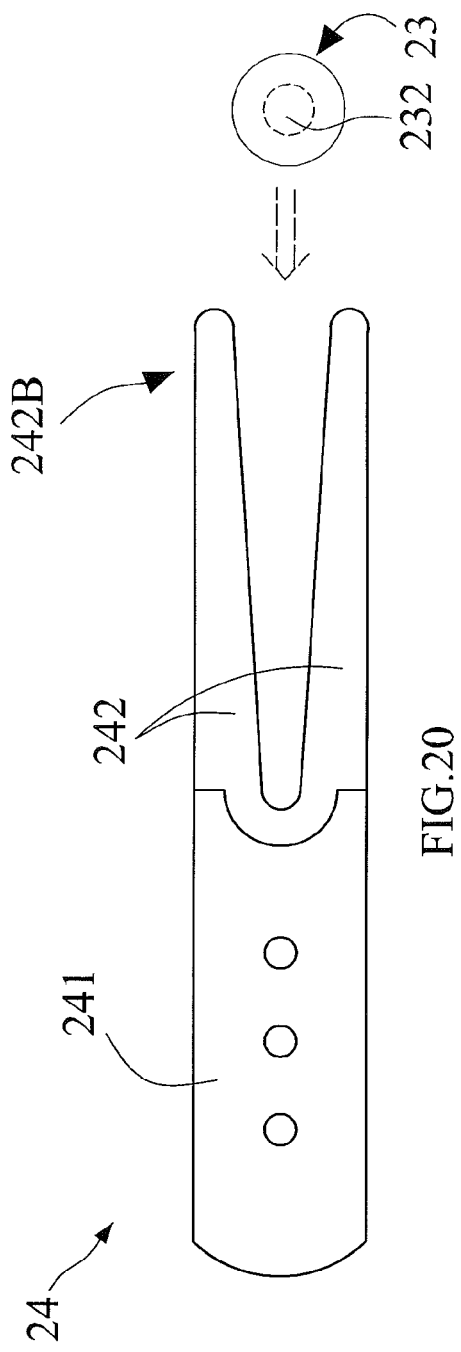

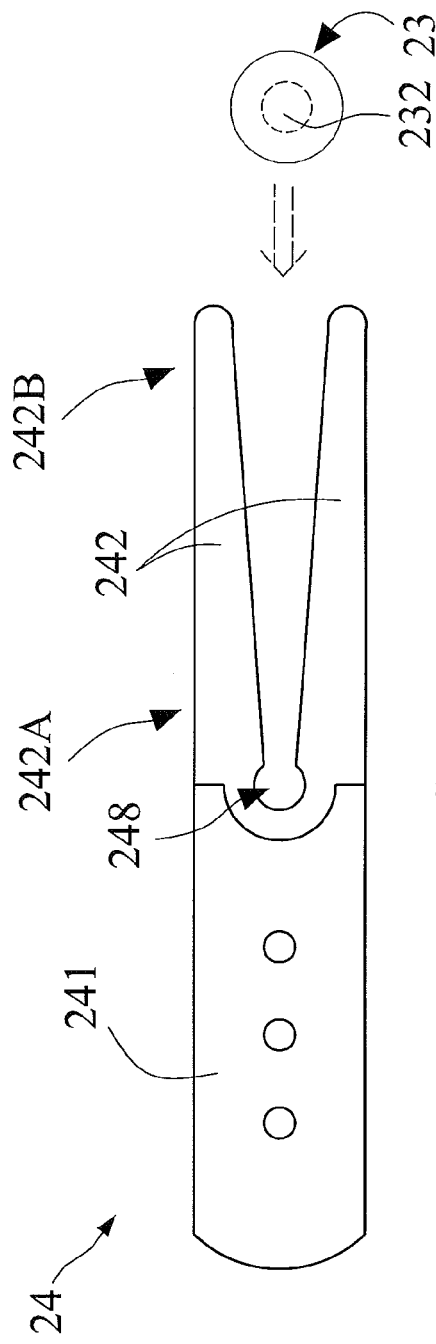
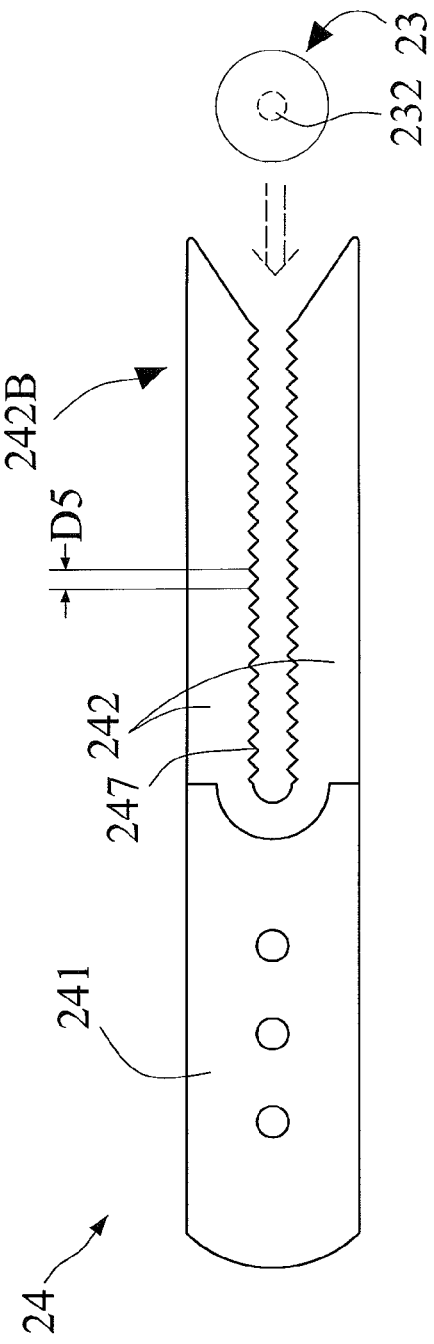
FIG.21
FIG.22

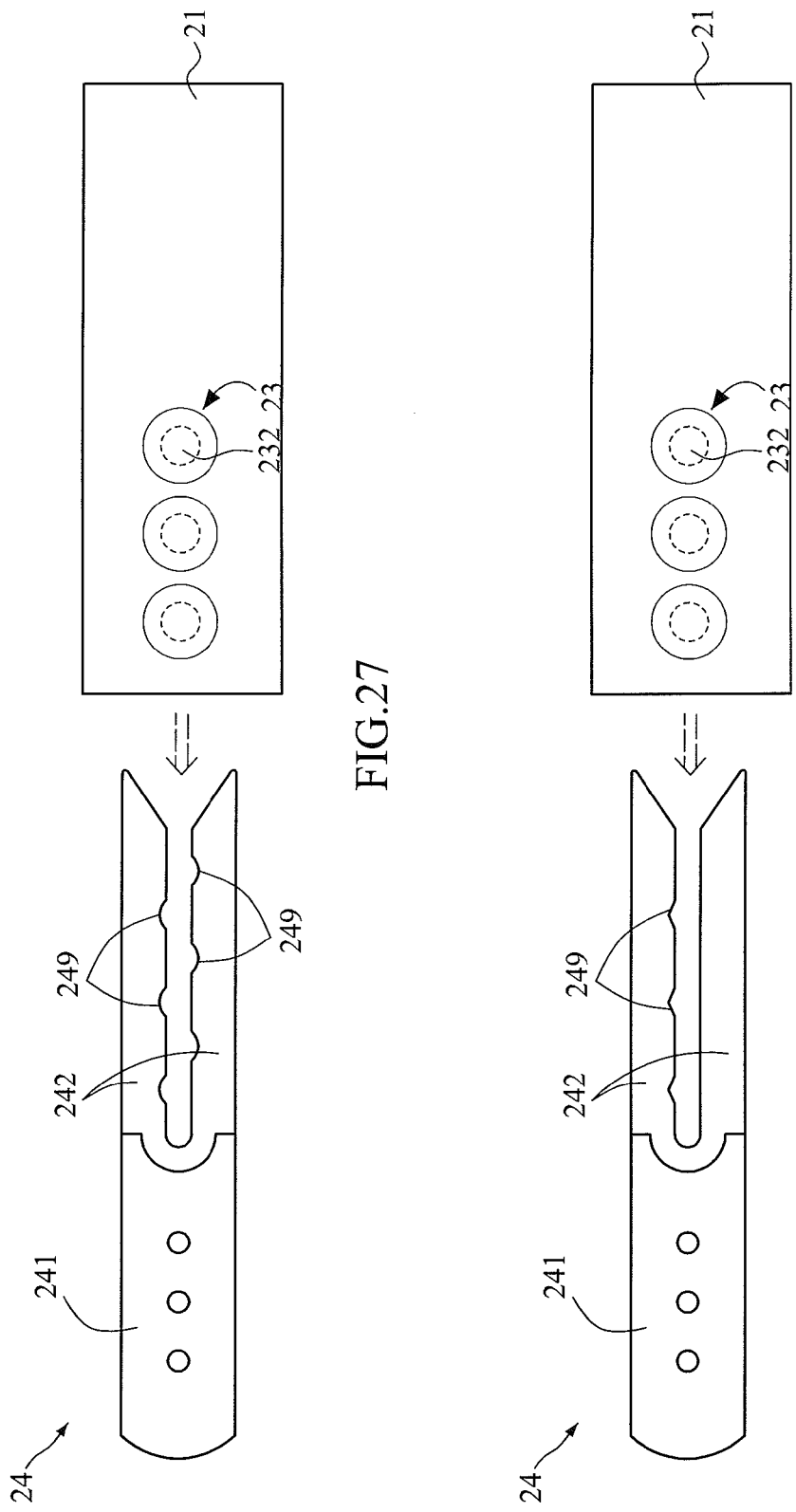

FITTING SUITE

CROSS-REFERENCE TO RELATED APPLICATION

This U.S. Non-provisional Application for Patent is a Continuation-In-Part (CIP) application of patent application Ser. No. 12/577,721 filed on Oct. 13, 2009 now abandonded. The entirety of the above-mentioned patent application is hereby incorporated by reference herein and made as a part of this specification.

FIELD OF THE INVENTION

The present invention relates to a fitting suite and, particularly, to the fitting suite accommodated to a composite closet, cabinet, combination house, mechanical assembly, toy structure, wooden interior decoration or other composite furniture.

DESCRIPTION OF THE PRIOR ART

Recently, appliances in daily life, such as toy structures, composite closets, cabinets, combination houses, mechanical assemblies, wooden interior decorations or other composite furniture, are getting more and more diversified to serve convenience. Those appliances may be constructed with various materials, and are normally coupled and fastened with screws.

Please refer to FIG. 1, which is a schematic diagram of a common composite cabinet of the prior art. In FIG. 1, the upper side of a cabinet 1 is depicted in an exploded diagram. As shown in FIG. 1, the upper side of the cabinet 1 is composed of three shelves 11, two side panels 12 and a back panel 14. The side panel 12 is coupled to the shelf 11 by screws 13. However, the fastening and calibration of the screw 13 is time consuming. Also, the threads of the screw 13 may become worn or may wear down the cabinet or shelf structures, and the cabinet 1 may loosen if the cabinet 1 is subjected several times to assembly or disassembly. Thus, it still remains a problem to be solved to shorten the assembly time and to make the cabinet 1 capable of multiple instances of assembly or disassembly.

SUMMARY OF THE INVENTION

The primary object of the invention is to shorten the assembling time, so as to easily and conveniently fabricate a mechanical composite structure. Moreover, the invention may also improve reliability and stability of the mechanical composite structure even if the components of the mechanical composite structure are subjected several times to assembly or disassembly.

To achieve the foregoing and other objects, a fitting suite for connecting a first board and a second board is provided. The fitting suite comprises a wedge and at least one fitting. The fitting has a locking pin coupled with the first board and a fitting head spaced from the first board. The wedge has a mounting coupled with the second board and a fork spaced from the second board. The fork is detachably secured with the fitting, the fitting head is clamped by the fork and the second board, and the fork is clamped by the fitting head and the first board. In this manner, the fitting head is touched by the fork and the second board, and the fork is touched by the fitting head and the first board. Thus, the fitting head exerts friction on both of the fork and the second board, and the fork exerts friction on both of the fitting head and the first board.

To achieve the foregoing and other objects, another fitting suite for connecting a first board and a second board is provided. The fitting suite comprises a wedge and at least one fitting. The fitting has a locking pin coupled with the first board and a fitting head spaced from the first board. The wedge has a mounting coupled with the second board and a fork spaced from the second board. The fork is detachably secured with the fitting, and a tip of each branch of the fork has a free end thinner than a root of the branch of the fork.

To achieve the foregoing and other objects, yet another fitting suite for connecting a first board and a second board is provided. The fitting suite comprises a wedge and at least one fitting. The fitting has a locking pin coupled with the first board and a fitting head spaced from the first board. The wedge has a mounting coupled with the second board and a fork spaced from the second board. The fork is detachably secured with the fitting, and the fork comprises either at least one matching element on a branch of the fork with concave-shape to receive the locking pin or a plurality of matching elements on the branch of the fork with arranged in a straight line to consecutively touch the locking pin.

In the aforementioned fitting suite, the mounting has at least one receiving room to receive a fastening member and to accommodate the fastening member fastened onto the second board. The volume of the receiving room is greater than the volume of the fastening member.

In the aforementioned fitting suite, the distance between two branches of the fork is gradually shrunk.

In the aforementioned fitting suite, the fitting head is selectively touched to the root of the fork.

In the aforementioned fitting suite, the wedge has a recess adjacent to the root of the fork and capable of receiving the fitting head. The fitting head is selectively touched to the recess.

In the aforementioned fitting suite, the first board comprises a lateral groove to receive the fitting, or the second board comprises a lateral groove to receive the wedge.

In the aforementioned fitting suite, the fork includes a plurality of matching elements periodically disposed at each branch of the fork. The matching elements of distinct branches all engage with the locking pin. Furthermore, the width of the matching element is smaller than or equal to the diameter of the locking pin, or the distance between the matching elements of the distinct branch is gradually shrunk.

In the aforementioned fitting suite, the number of the fitting is a plurality, and the diameters of the distinct locking pins are unequal. Two branches of the fork simultaneously engage with the plurality of the locking pins.

In the aforementioned fitting suite, the fork has an equal number or a greater number of matching elements compared with the number of the fitting. The matching element is disposed on at least one branch of the fork to selectively match with the locking pins. Moreover, the width of the matching element is greater than or equal to the diameter of the locking pin. Each branch of the fork has a plurality of matching elements, and the matching elements on a distinct branch of the fork are interlaced. Each branch of the fork has a plurality of matching elements, and the distance between the matching elements of the distinct branch is gradually shrunk.

In the aforementioned fitting suite, each branch of the fork comprises at least one fastening device disposed thereon to make the branches couple to the second board.

As described above, the fitting suite of the present invention may shorten the time of fastening or calibration. Also, the fitting suite is able to be subjected to assembly or disassembly multiple times. Thus, the present invention can be adopted in many applications such as composite closets, cabinets, combination houses, mechanical assemblies, toy structures, wooden interior decorations, composite furniture, etc.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 16A~16B are schematic diagrams for the 9$^{th}$ embodiment of the present invention;

FIG. 17 is a schematic diagram for the 10$^{th}$ embodiment of the present invention;

FIG. 18 is a schematic diagram for the 11$^{th}$ embodiment of the present invention;

FIG. 19 is a schematic diagram for the 12$^{th}$ embodiment of the present invention;

FIG. 20 is a schematic diagram for the 13$^{th}$ embodiment of the present invention;

FIG. 21 is a schematic diagram for the 14$^{th}$ embodiment of the present invention;

FIG. 22 is a schematic diagram for the 15$^{th}$ embodiment of the present invention;

FIG. 27 is a schematic diagram for the 20$^{th}$ embodiment of the present invention;

FIG. 28 is a schematic diagram for the 21$^{st}$ embodiment of the present invention;

DESCRIPTION OF THE PREFERRED EMBODIMENTS

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art.

<1$^{st}$ Embodiment>

Figure 2A:
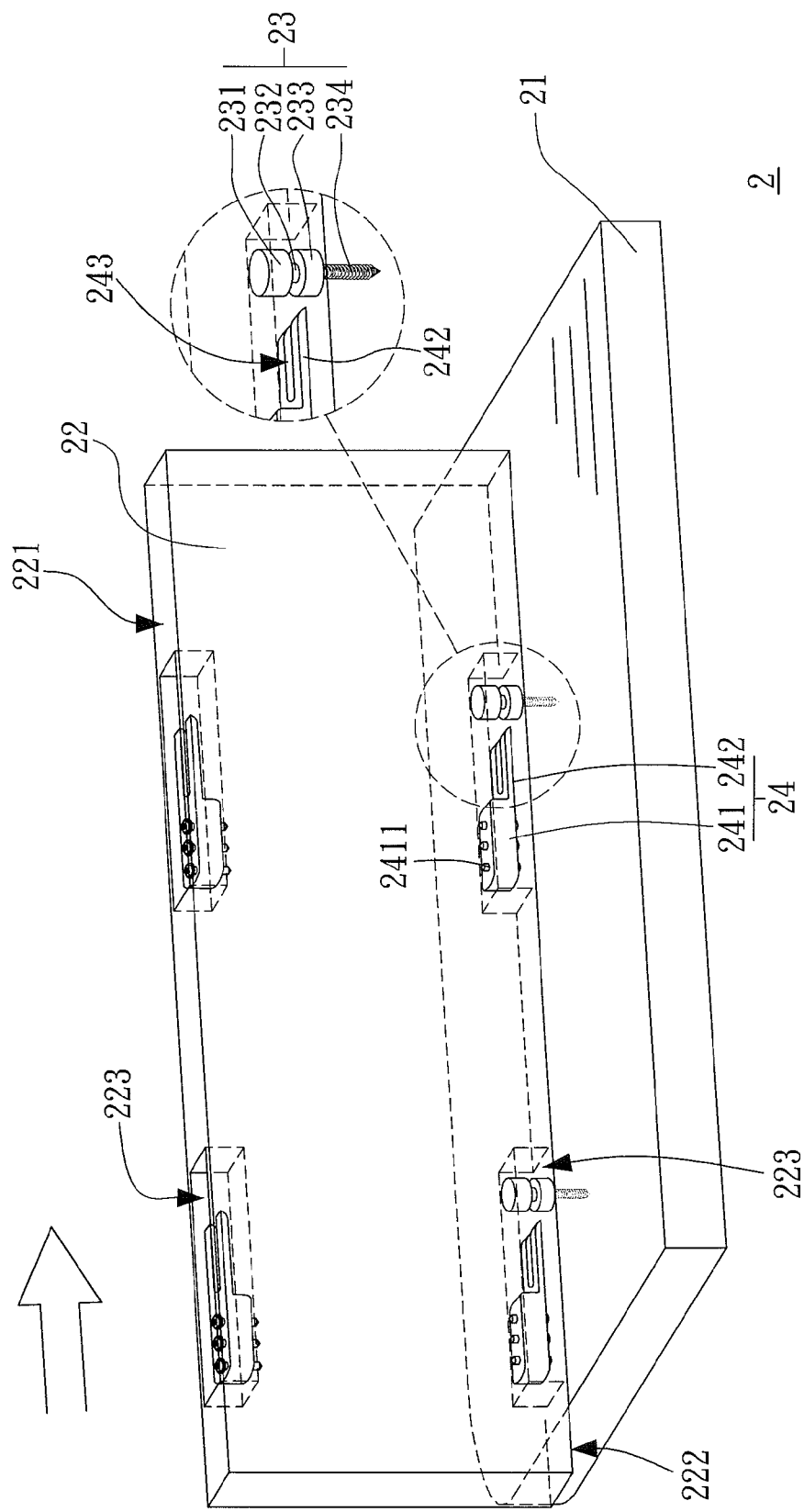
FIG. 2A~2B are schematic diagrams for the assembling procedure of a composite structure according to the 1$^{st}$ embodiment of the present invention.

Please refer to FIG. 2A. A composite structure 2 includes a fitting suite, a first board 21 and a second board 22. The fitting suite, utilized for connecting the first board 21 and the second board 22, comprises a fitting 23 and a wedge 24. In the present invention, the first board 21 and the second board 22 could be any physical article or any configuration, including regular or irregular shapes.

Two fittings 23 are firmly fixed on the upper side of the first board 21. The second board 22 contains a first side 221 and a second side 222, and both the first side 221 and second side 222 have two grooves 223 disposed thereon. At least one wedge 24 is disposed in the groove 223. In this embodiment, the first board 21 and the second board 22 are made of wood. However, they may be replaced with metal or plastic.

Moreover, the fitting 23 includes a fitting head 231, a locking pin 232, a fitting base 233 and a male thread 234. Both the width of the fitting head 231 and of the fitting base 233 are larger than the radius of the locking pin 232. Besides, the wedge 24 has a fork 242 disposed at the front of the wedge 24 and a mounting 241 disposed at the rear of the wedge 24. The fork 242 extends from the mounting 241. The fork 242 has a slot 243 with a width smaller than the radius of the fitting head 231. In addition, the fitting base 233 is abutted against the upper surface of the first board 21, and the male thread 234 is locked beneath the upper surface of the first board 21.

Figure 2B:
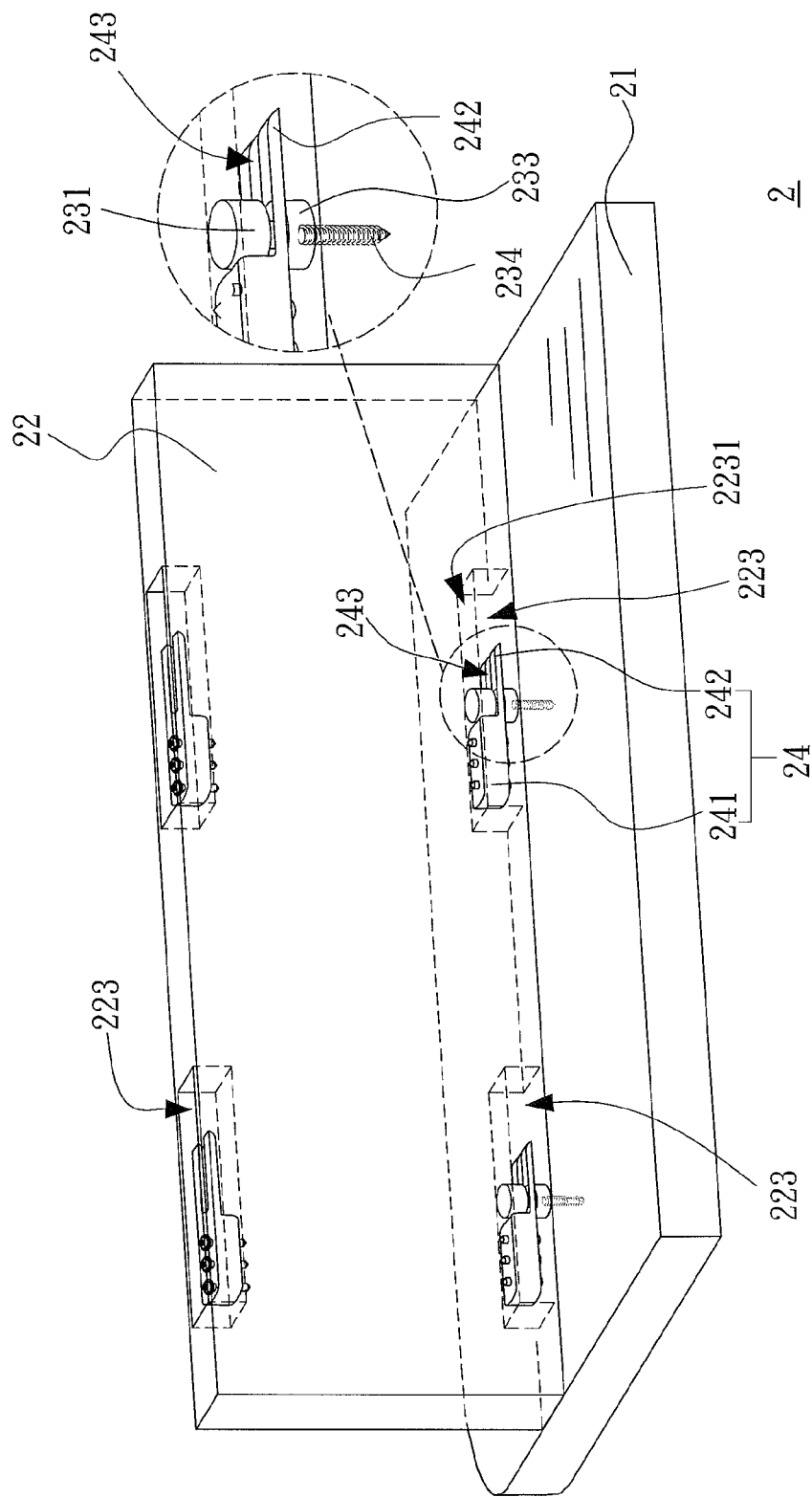

When the first board 21 and the second board 22 are assembled, the groove 223 is aligned with the fitting 23, and the second board 22 is moved downward to drive the fitting 23 into the groove 223. Afterward, referring to FIG. 2B, the second board 22 is pushed toward the right in order to urge the locking pin 232 (refer to FIG. 2A simultaneously) to enter the slot 243 of the wedge 24. Since the thickness of the fitting head 231 is approximate to or slightly larger than the distance from the fork 242 to the groove base 2231, the fitting head 231, as a result, is engaged by the fork 242 and the groove base 2231. Thus, the second board 22 may be fixed firmly on the first board 21. Furthermore, due to the friction existing between the fitting head 231 and each of the fork 242 and the groove base 2231, there must be a large enough force to push the first board 21 leftward to overcome the friction. If so, the fork 242 may be separated from the fitting head 231, and the first board 21 may be separated from the second board 22. In this case, when the fitting 23 is coupled or fastened to the wedge 24, the fork 242 and the locking pin 232 are tightly fitted to reinforce the combination between the fitting 23 and the wedge 24.

In the aforementioned description, the reliability and simplification of the composite structure 2 of the present invention may be understood. When assembling the first board 21 and the second board 22, the groove 223 is needed to be aligned with the fitting 23 to locate the fitting 23 inside the groove 223 and pushed with a sufficient horizontal force on the second board 22 to fasten the fitting 23 and the wedge 24. In the meantime, the fitting head 231 is engaged by the fork 242 and the groove base 2231, and as a result, the second board 22 is coupled to the first board 21.

Figure 3:
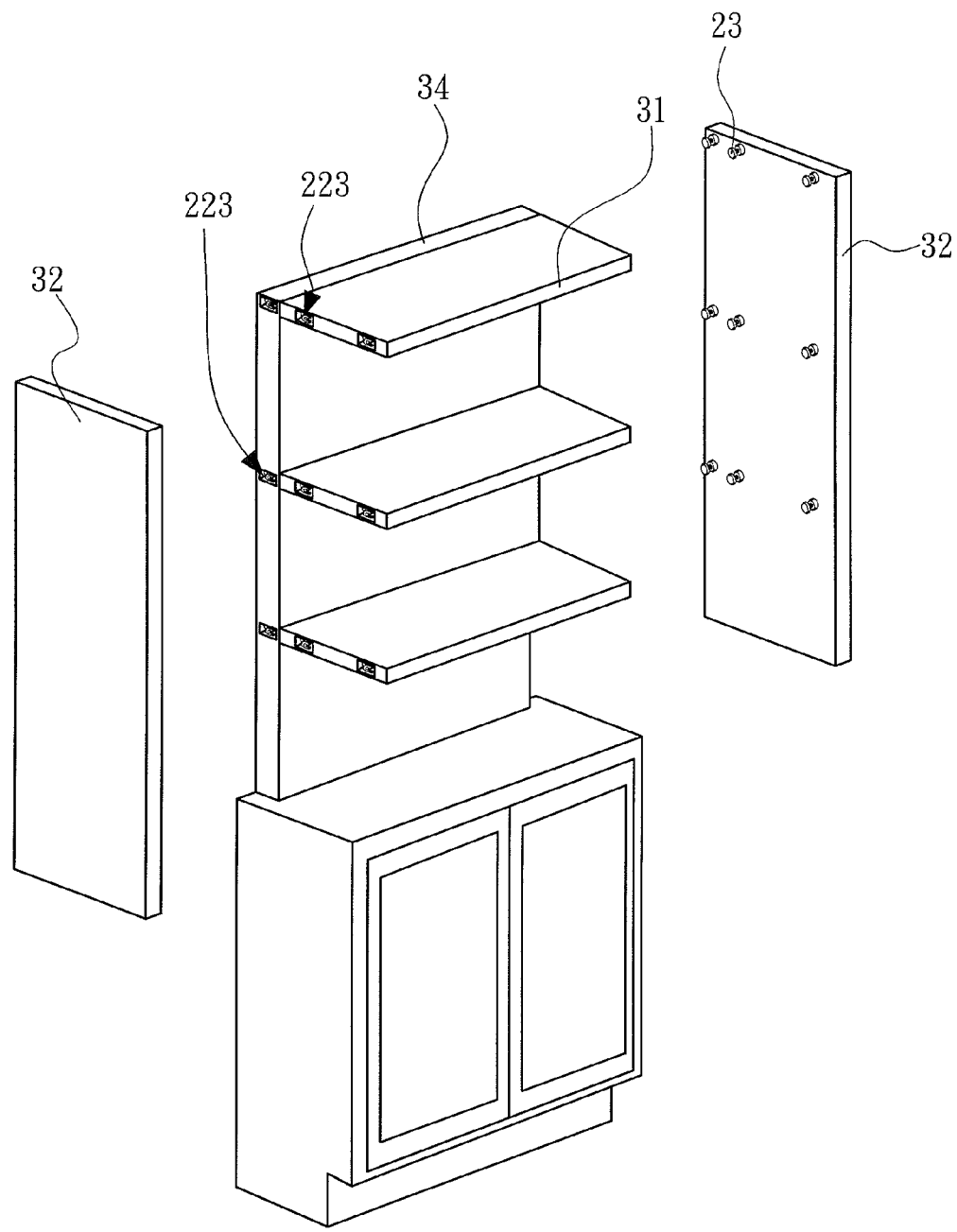
FIG. 3 is an application diagram for the 1$^{st}$ embodiment of the present invention.

Next, a cabinet will be introduced to show how the present invention works and what benefit it may have. Please refer to FIG. 3, which is an application diagram of a cabinet in the present invention. As shown in FIG. 3, the upper side of a cabinet 3 includes three shelves 31, two side panels 32 and a back panel 34. The side panels 32 contain a plurality of fittings 23. The shelves 31 and the back panels 34 contain a plurality of grooves 223. Each groove 223 comprises a wedge 24 as shown in FIG. 2A. In FIG. 3, the side panel 32 corresponds to the first board 21 in FIG. 2A, and the shelf 31 corresponds to the second board 22 in FIG. 2A. When assembling the side panel 32 and the shelf 31, the groove 223 is aligned with the fitting 23 to locate the fitting 23 inside the groove 223 and then pushed with a horizontal force on the side panel 32, to couple the side panel 32 with the shelf 31. Additionally, the assembling procedure of the back panel 34 is similar to those of previous descriptions. Thus, there is no need for further addressing.

Figure 1:
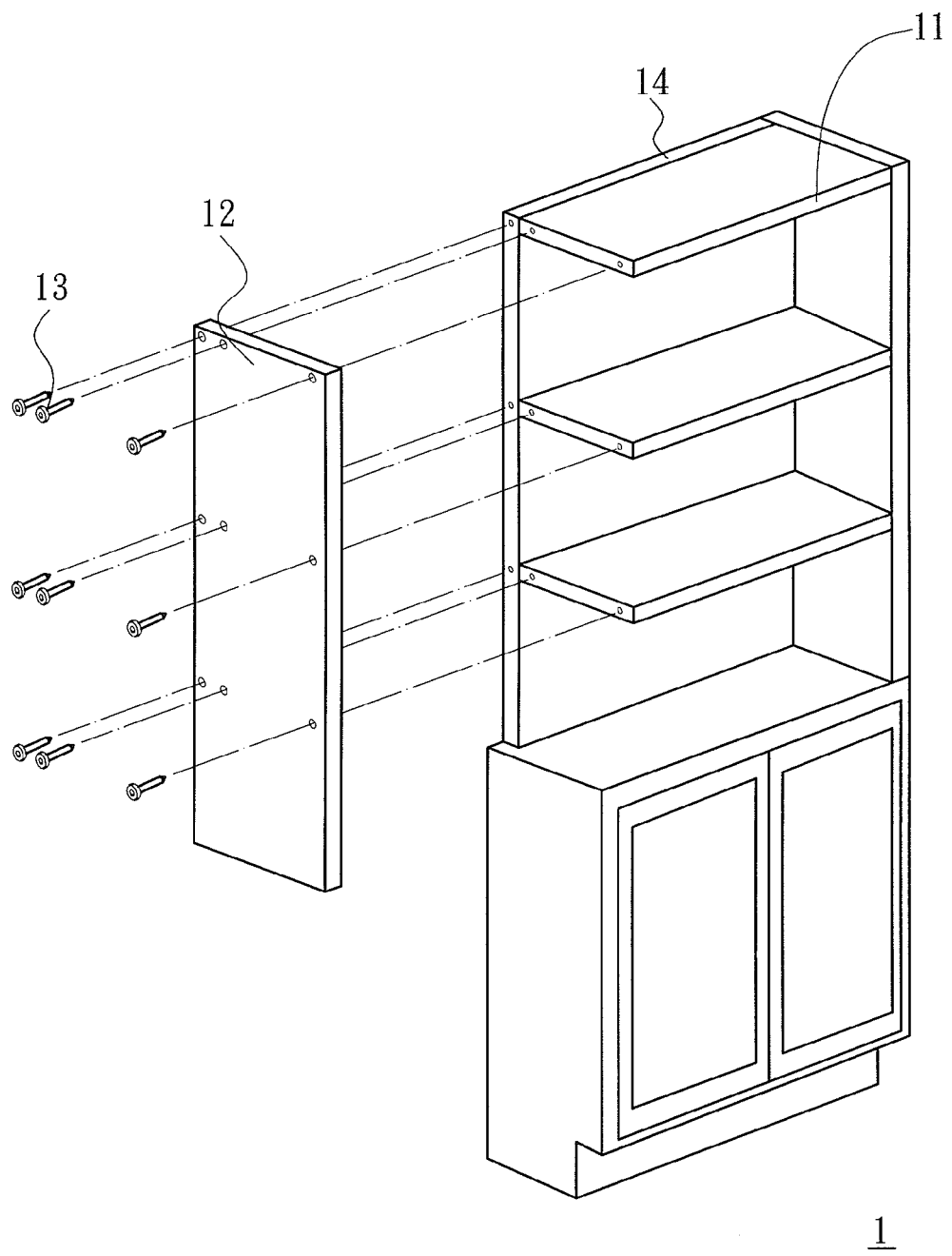
FIG. 1 is a schematic diagram of a composite cabinet of the prior art.

In a comparison of the present invention with screw locking of the prior art in FIG. 1, the assembly time of the present invention is obviously reduced. Furthermore, the side panel 32, the shelf 31 and the back panel 34 are assembled without any screws. Thus, the cabinet 3 may be capable of assembling or disassembling multiple times without loosening or wearing of its components.

<2$^{nd}$ Embodiment>

Figure 4:
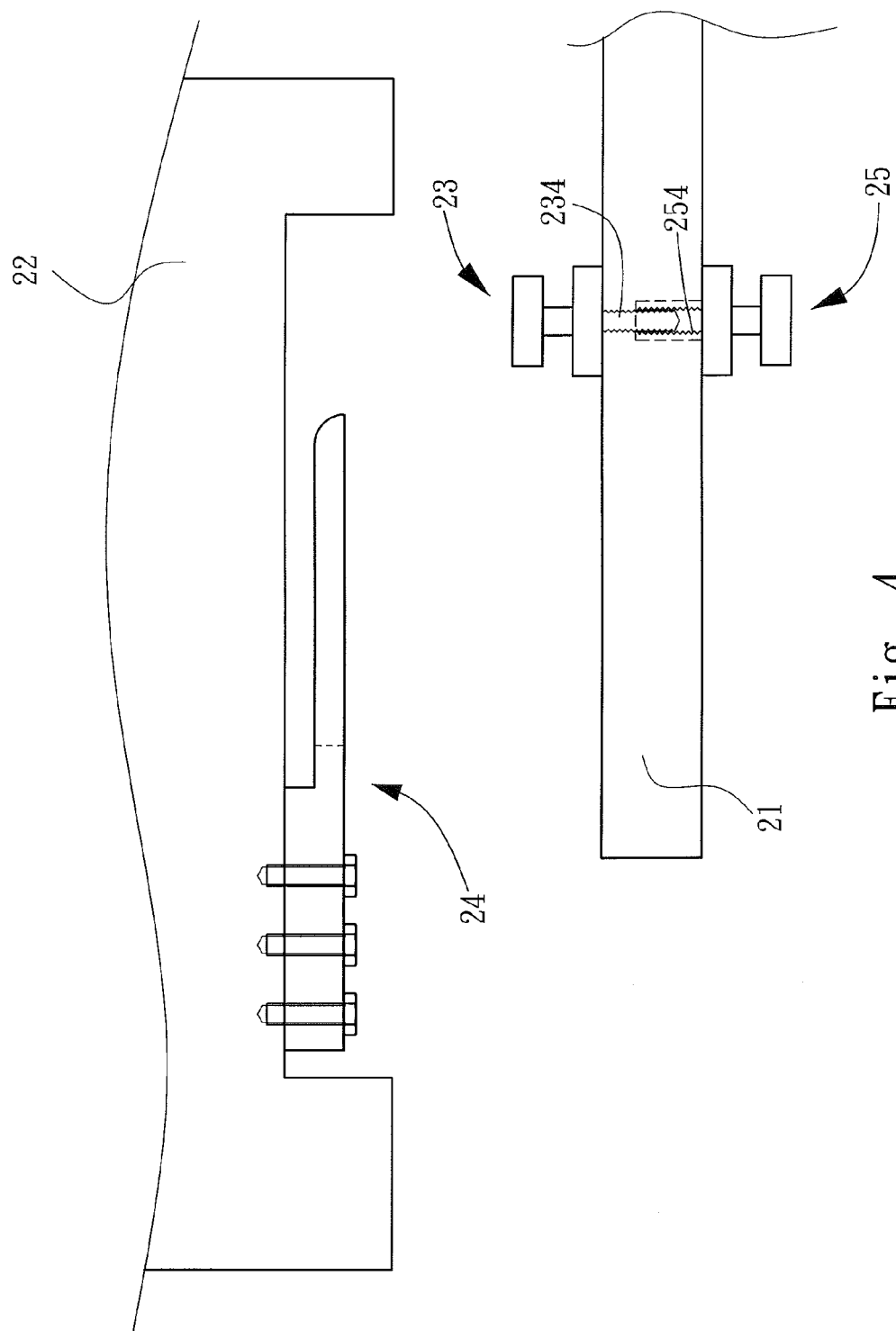
FIG. 4~5 are schematic and application diagrams for the 2$^{nd}$ embodiment of the present invention.
Figure 5:
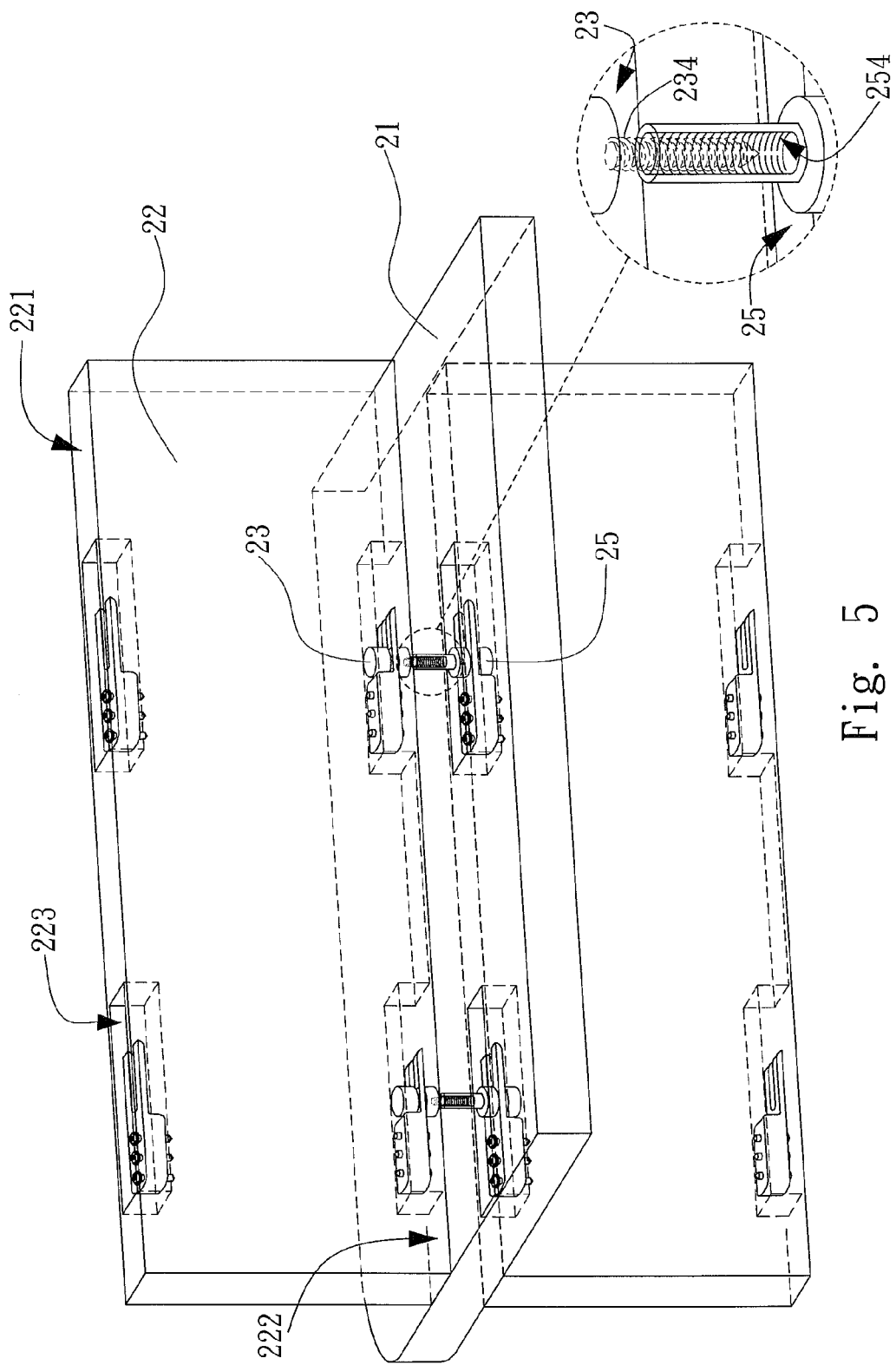

Please refer to FIG. 4, which is a schematic diagram for the coupling of a male fitting and a female fitting. As shown in FIG. 4, the first board 21 includes a male fitting 23 and a female fitting 25 disposed at the upper side and the lower side of the first board 21 respectively. The male fitting 23 and the female fitting 25 have similar configurations. However, the female fitting 25 has a female thread 254 to match up with and fasten to the male thread 234 to couple the male fitting 23 and the female fitting 25. Afterward, please refer to FIG. 5, which is a schematic diagram of a composite structure in a second embodiment of the present invention. As shown in FIG. 5, due to the disposition of the male fitting 23 and the female fitting 25, the first board 21 is able to couple the second boards 22 at the upper side and the lower side of the first board 21 respectively. In this case, the male fitting 23 and the female fitting 25 are coupled by fastening the male thread 234 and the female thread 254.

In practice, each lateral side of the second board 22 has more than two grooves 223 in the first side 221 or in the second side 222, which are depicted in FIG. 5, according to the span width of the first board 21 and the second board 22. There is no restriction on the number of grooves 223. Correspondingly, the male fitting 23 and the female fitting 25 on the first board 21 are disposed according to the number of grooves 223.

The fitting base 233 of the male fitting 23 may be embedded into the first board 21 by disposing the fitting base 233 inside the first board 21, instead of abutting against the surface of the first board 21 as shown in FIG. 2A, in order to reduce the volume of the fitting base 233 exposed outside. Furthermore, the fitting base 233 may be omitted.

Figure 6B:
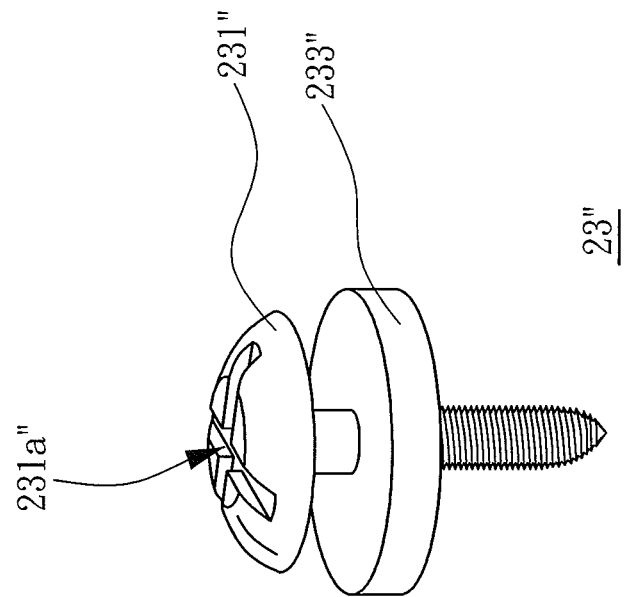
FIG. 6A~6B and FIG. 7 are other shaped diagrams of the fitting.
Figure 6A:
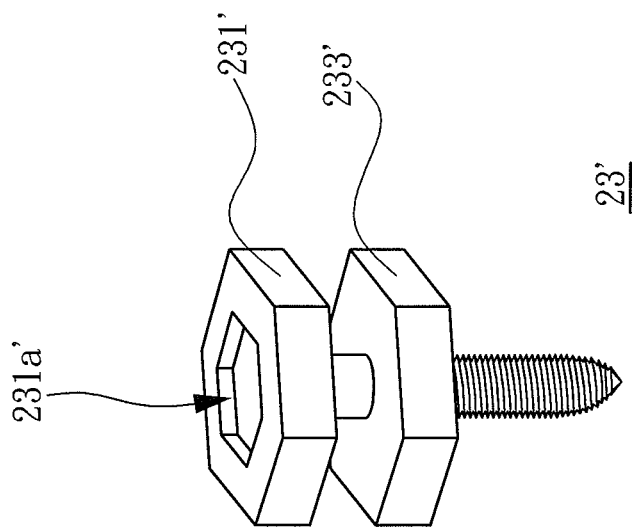

Additionally, compared to the mounting 241 fastened by three fastening members 2411 shown in FIG. 2A, the number of fastening members 2411 may also be changed to one or two fastening members 2411 (the fastening member 2411 is a screw in this embodiment). As for the configuration of the fitting 23, the circle-shaped fitting head 231 may be replaced. In FIG. 6A, the fitting head 231' and the fitting base 233' of the fitting 23' are hexagonal. The hex head 231a' is suitable for a hex wrench. In FIG. 6B, the fitting head 231" of the fitting 23" is cone-shaped. The Philips head 231 a" is suitable for a screwdriver. Moreover, the female fitting 25 may have a similar configuration to the fitting head 231' and fitting base 233' in fitting 23', or fitting head 231" and fitting base 233" in fitting 23".

Figure 7:
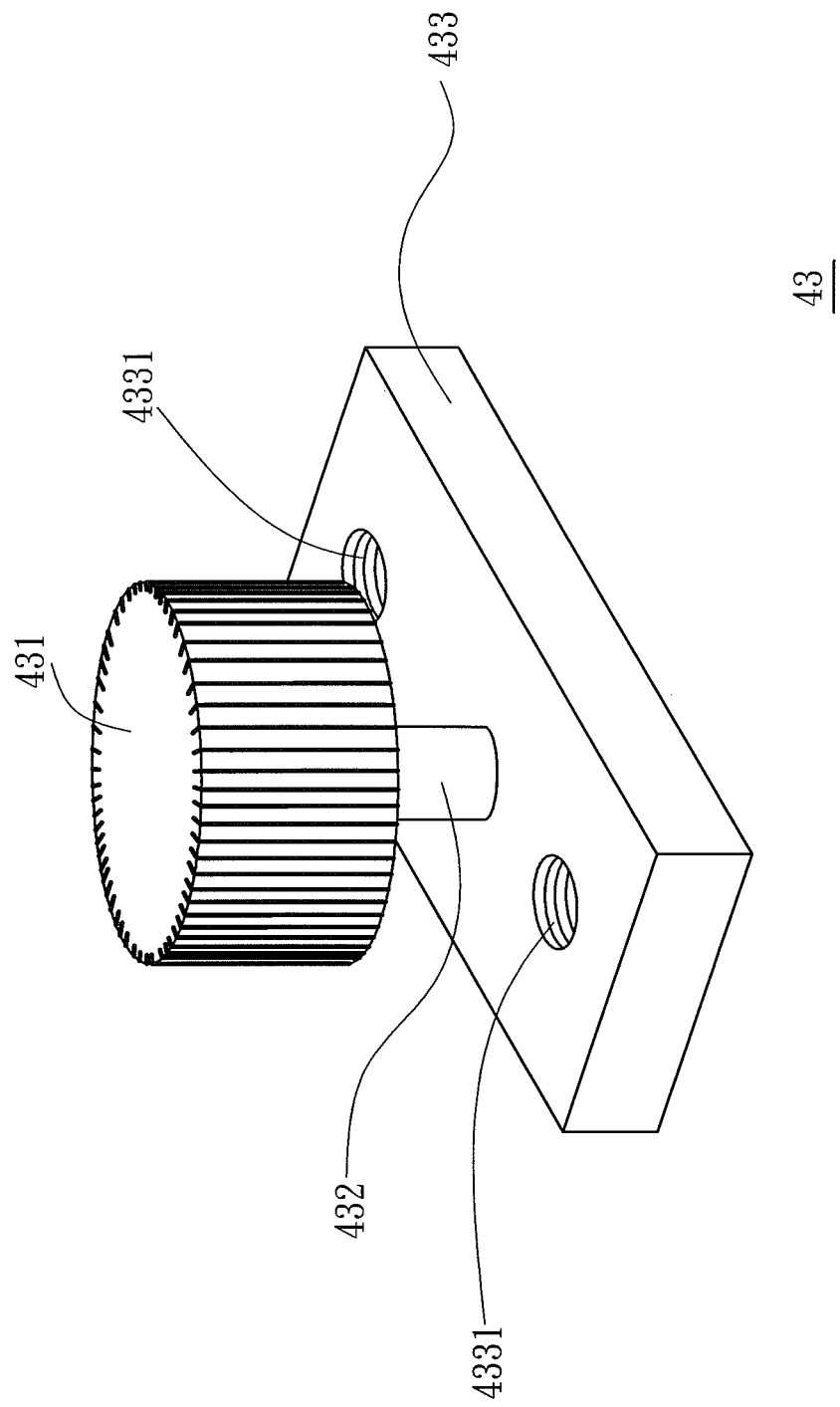

In the aforementioned embodiments, the material of the male fitting or the female fitting may be metal, plastic or other materials. Besides, the fitting base 233 in FIG. 2A may be designed with other configurations. Please refer to FIG. 7, which is a schematic diagram of a male fitting of a further embodiment. The fitting 43 contains a fitting head 431, a locking pin 432 and a fitting base 433. In this embodiment, the fitting 43 has no male thread (e.g., 234 as shown in FIG. 2A). Instead, the fitting 43 has the fitting base 433 with a cubic shape, and the fitting base 433 has two screw holes 4331 disposed at two ends of the fitting base 433 respectively. Thus, the fitting 43 is able to be firmly fixed on the first board 21 by the screw holes 4331.

<3$^{rd}$ Embodiment>

Figure 8A:
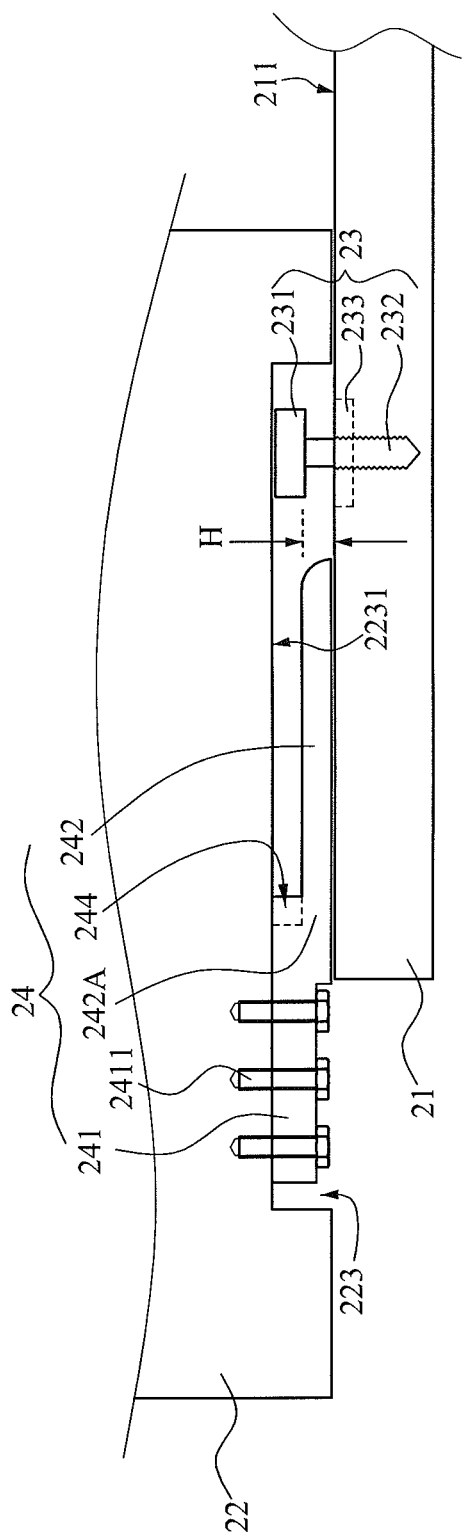
FIG. 8A~8B are schematic diagrams for the 3$^{rd}$ embodiment of the present invention.
Figure 8B:
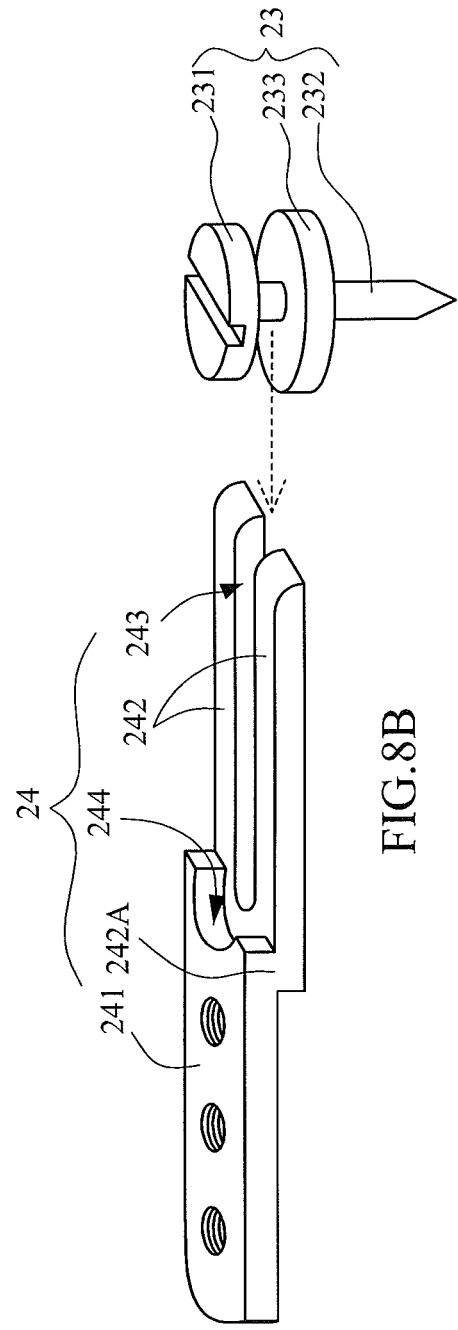

As shown in FIG. 8A~8B, the fitting suite is utilized for connecting the first board 21 and the second board 22. The fitting suite comprises a fitting 23 and a wedge 24. The fitting 23 has a locking pin 232, a fitting head 231 and a fitting base 233. The locking pin 232 is coupled with the first board 21 and the fitting head 231 is spaced from the first board 21. The fitting base 233 may touch the upper surface 211 of the first board 21, to increase friction against the first board 21 and reinforce mechanical strength. Further, the fitting base 233 has benefit of stopping the fitting 23 at a specific location, so that a height H between the fitting head 231 and the upper surface 211 can be predetermined. In this manner, the lower end of the locking pin 232 is locked or screwed on the first board 21. Thus, manual adjustment for locating of the fitting 23 or pre-drilling a hole for receiving the locking pin 232 is not required. Preferably, the fitting base 233 may be buried beneath the upper surface 211 of the first board 21, which is shown in FIG. 8A, to save space.

The second board 22 comprises a lateral groove 223 to receive the wedge 24.

The wedge 24 has a mounting 241 in the left end and a fork 242 in the right end. The mounting 241 is coupled with the second board 22 by three fastening members 2411, so that the mounting 241 is fixed on the groove base 2231. The fork 242 is spaced from the groove base 2231 of the second board 22. The wedge 24 has a recess 244 which is adjacent to a root 242A of the fork 242.

When the wedge 24 and the second board 22 are moved rightward (shown in FIG. 8A), the locking pin 232 enters the slot 243, and two branches of the fork 242 are inserted into the lower side of the fitting head 231. In this manner, the fork 242 is detachably secured with the fitting 23. After securing, the fitting head 231 is clamped by the fork 242 and the groove base 2231, and the fork 242 is clamped by the fitting head 231 and the upper surface 211, with the second board 22, the fitting head 231, the fork 242 and the first board 21 vertically arranged in order. Specifically, the fitting head 231 is touched by the fork 242 and the second board 22, and the fork 242 is touched by the fitting head 231 and the first board 21. Thus, the fitting head 231 exerts friction on both of the fork 242 and the second board 22, and the fork 242 exerts friction on both of the fitting head 231 and the first board 21. Therefore, friction between the first board 21, fitting head 231, fork 242 and second board 22 is maximized, to reinforce the fastening strength. Moreover, the fitting head 231 can be selectively touched to the recess 244, and the recess 244 has a profile matched with the fitting head 231, which is thus capable of receiving the fitting head 231. When the wedge 24 is moved to the rightmost, the recess 244 may touch and abut the fitting head 231, so that friction or the fastening force between the fitting head 231 and the recess 244 may be further increased.

<4$^{th}$ Embodiment>

Figure 9:
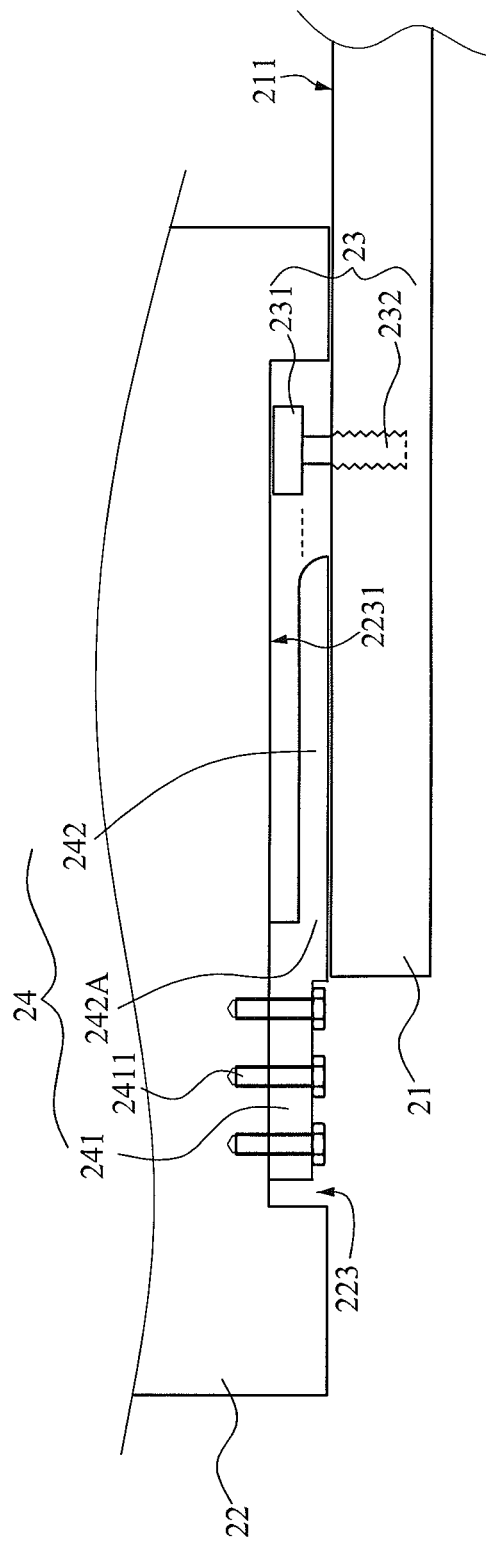
FIG. 9 is a schematic diagram for the 4$^{th}$ embodiment of the present invention.

As shown in FIG. 9, the wedge 24 has no recess 244, and the fitting 23 has no fitting base 233. In this embodiment, the locking pin 232 has a thread, and the tip of the locking pin 232 is blunt. As a result, the hole for receiving the locking pin 232 is drilled in advance. In this manner, the location of the fitting head 231 (i.e. altitude of fitting head 231) is determined by the pre-drilled hole.

When the wedge 24 and the second board 22 are moved rightward, the fitting head 231 may or may not touch the root 242A of the fork 242 (i.e. left end of the fork 242). If the fitting head 231 touches the root 242A of the fork 242, the fitting head 231 will simultaneously abut the groove base 2231 and the fork 242. In this manner, friction exerted at the upper side, lower side and left side of the fitting head 231 is expected. Therefore, the fastening force is further increased.

<5$^{th}$ Embodiment>

Figure 10:
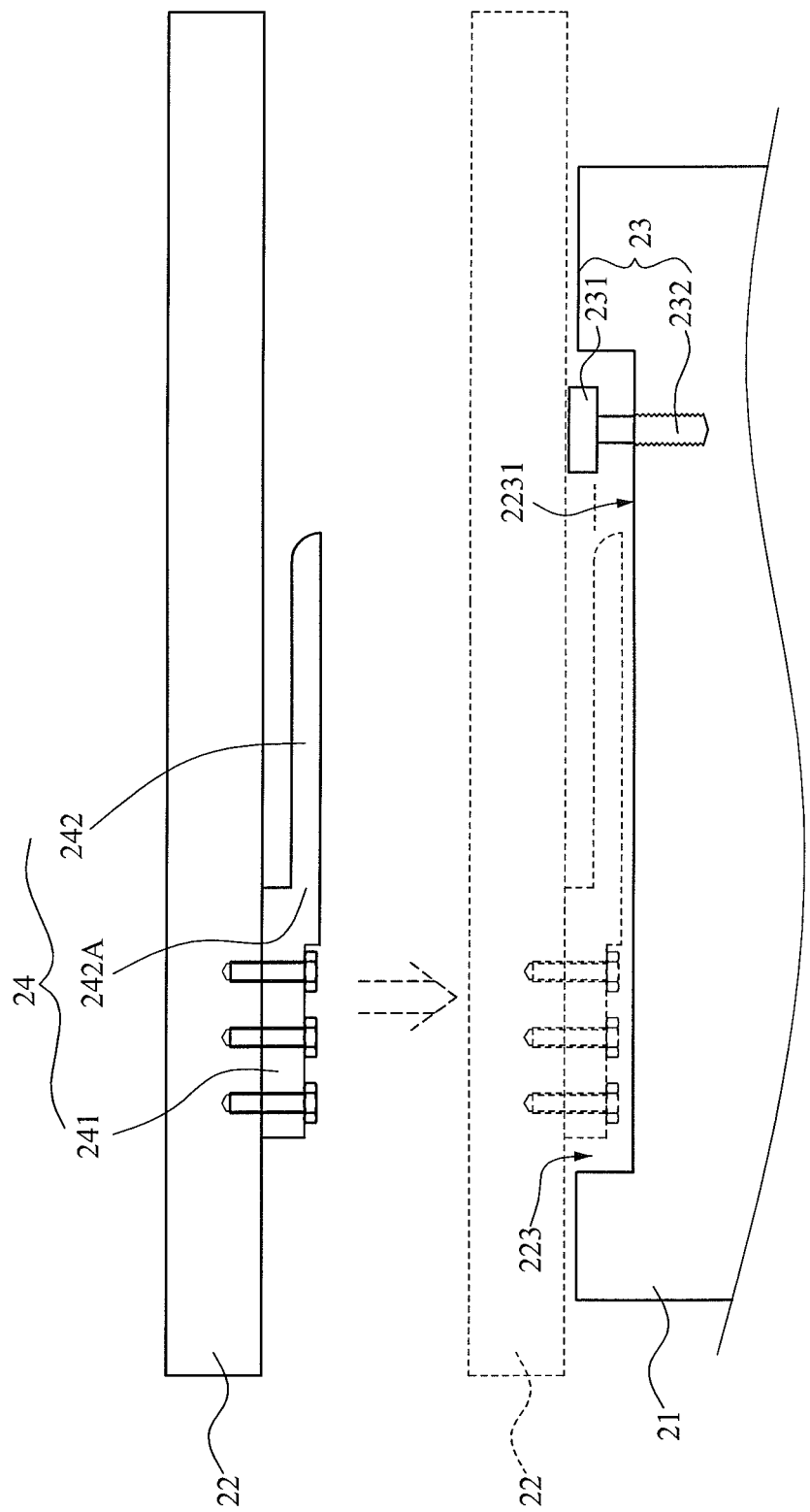
FIG. 10 is a schematic diagram for the 5$^{th}$ embodiment of the present invention.

As shown in FIG. 10, instead of the second board 22 comprising a groove 223 thereon (shown in the previous embodiment), the groove 223 may also be disposed at the lateral side of the first board 21, to receive the fitting 23. Namely, the locking pin 232 is fixed at the groove base 2231 of the first board 21. Besides, the wedge 24 is firmly fixed at the lower side of the second board 22.

After the wedge 24 and the second board 22 are moved downward, the fork 242 and the fitting 23 can be secured by the previous manner.

<6$^{th}$ Embodiment>

Figure 11:
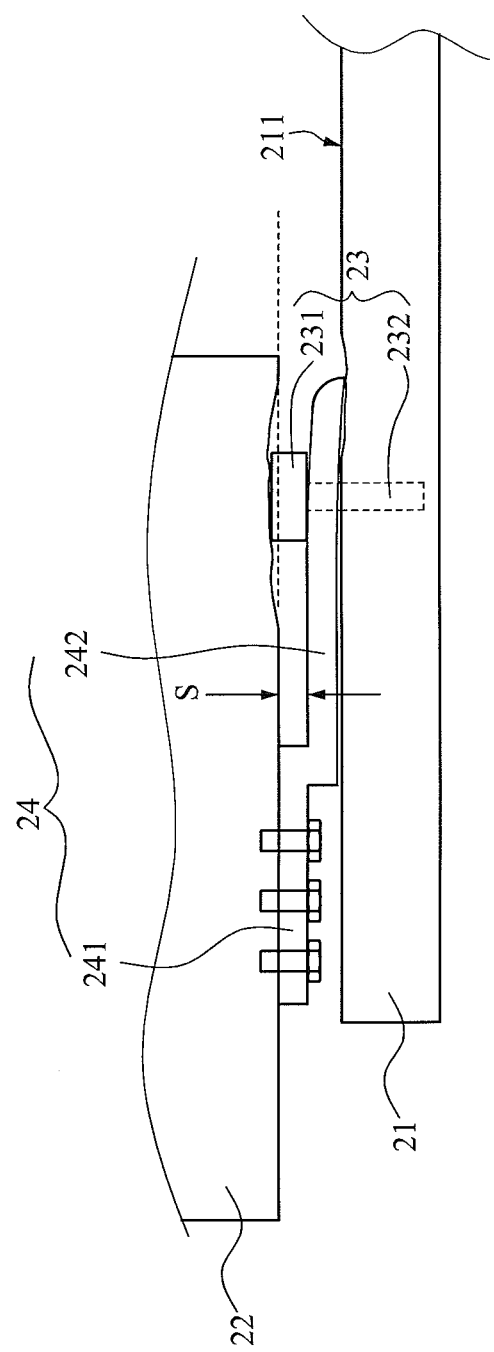
FIG. 11 is a schematic diagram for the 6$^{th}$ embodiment of the present invention.

As shown in FIG. 11, there is no groove 223 disposed at the first board 21 or the second board 22. In this embodiment, the wedge 24 is disposed at the lower side of the second board 22, and the fitting 23 is fixed on the upper surface 211 of the first board 21. Thus, the first board 21 and the second board 22 may be coupled by fastening of the wedge 24 and the fitting 23. In addition, if the thickness of the fitting head 231 is greater than the space S (the distance between the second board 22 and the fork 242), the fork 242 might slightly bend downward. In this scenario, the first board 21 or the second board 22 might be slightly deformed if the first board 21 or the second board 22 is flexible materials such as wood, plastic, rubber, resin, etc. In other embodiments, the fitting 23 and the first board 21 may be a one-body form (one-piece shaped).

<7$^{th}$ Embodiment>

Figure 12A:
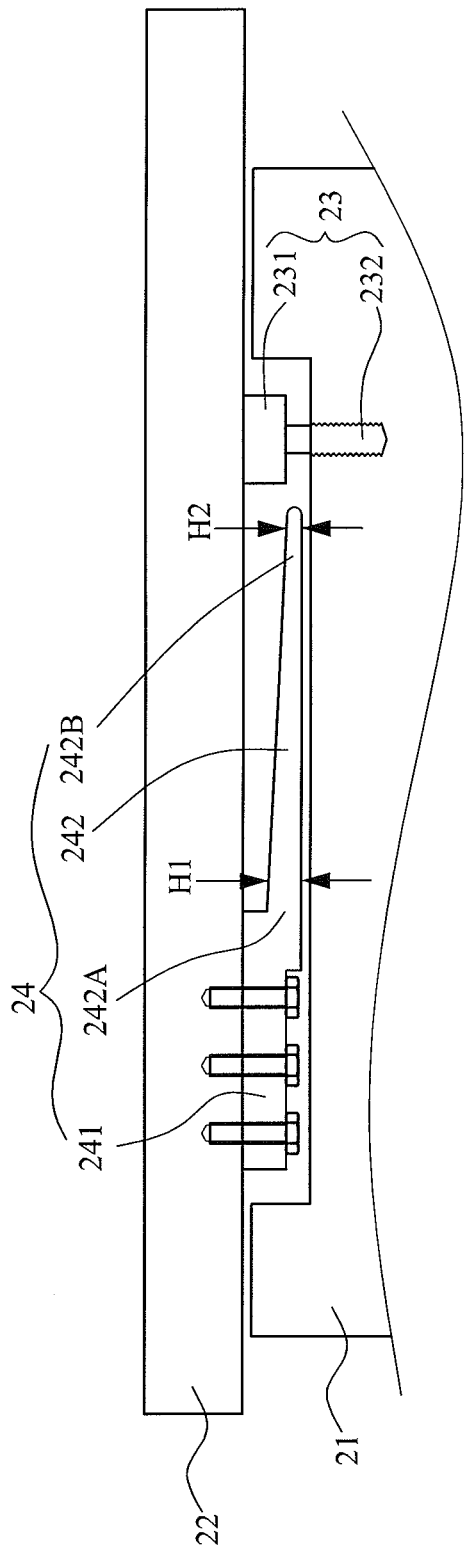
FIG. 12A~12B are schematic diagrams for the 7$^{th}$ embodiment of the present invention.
Figure 12B:
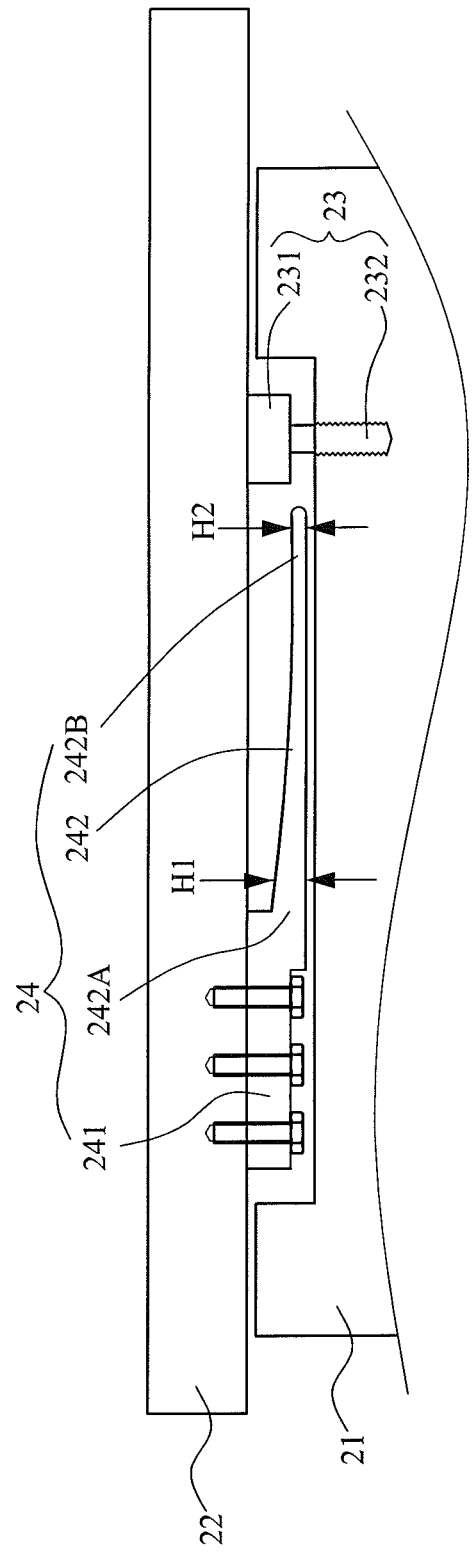

As shown in FIG. 12A, each branch of the fork 242 has a tip 242B on the right and a root 242A on the left. As shown in this side-view, the root 242A has a height H1 greater than the height H2 of the tip 242B, and the tip 242B has a smaller circumference than the root 242A. Specifically, the tip 242B of each branch of the fork 242 has a free end thinner than the root 242A of the branch of the fork 242. In this manner, the fitting head 231 has greater friction when approaching the root 242A. It may have benefit to make the friction adjustable. In another embodiment as shown in FIG. 12B, the upper side between the root 242A and the tip 242B of the fork 242 may have an arc-shaped or some other profile.

<8$^{th}$ Embodiment>

Figure 13A:
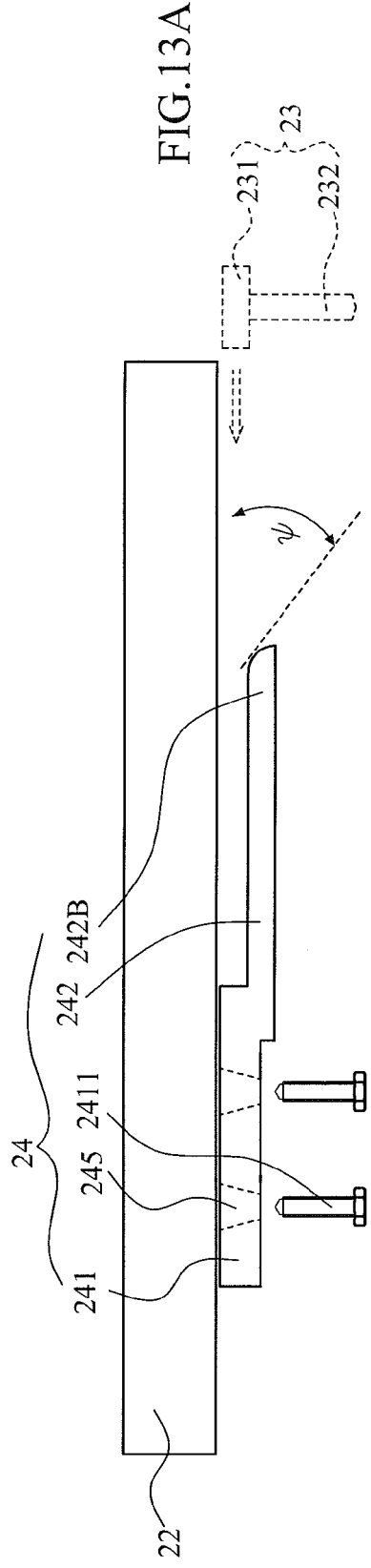
FIG. 13A~13C and FIG. 14~15 are schematic diagrams for the assembling procedure according to the 8$^{th}$ embodiment of the present invention.
Figure 13B:
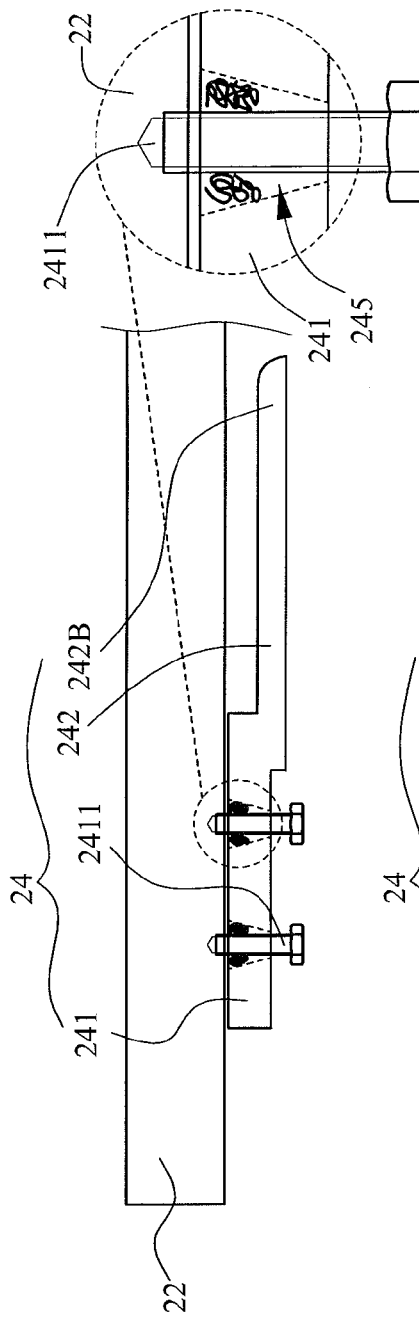
Figure 13C:
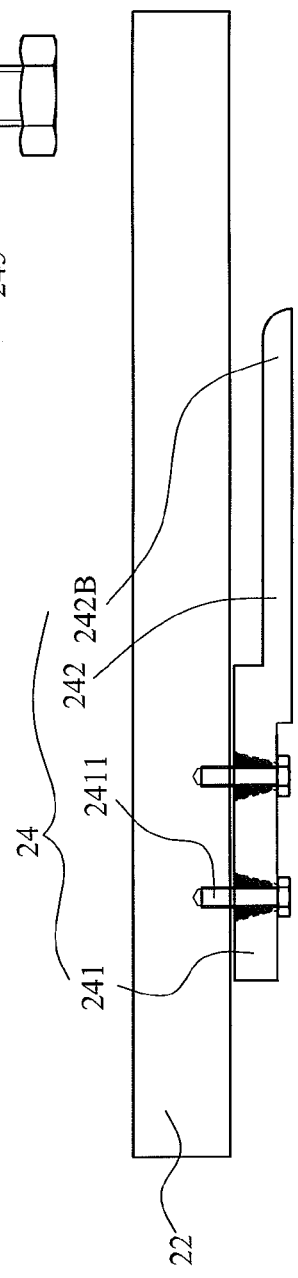

As shown in FIG. 13A, the mounting 241 has two receiving rooms 245 vertically passing through the mounting 241, in which the receiving rooms 245 could be countersunk. The receiving rooms 245 may receive two fastening members 2411, to accommodate the fastening member 2411 fastened onto the second board 22. Further, the tip 242B of the fork 242 has a leading angle Ψ to facilitate fastening with the fitting head 231. As shown in FIGS. 13A~13C, the volume of the receiving room 245 is greater than the volume of the fastening member 2411. When the fastening members 2411 are screwed into the second board 22, the receiving room 245 may contain and restrict the generated saw dust. In this manner, the generated saw dust will never squeeze the wedge 24 any more.

Figure 14:
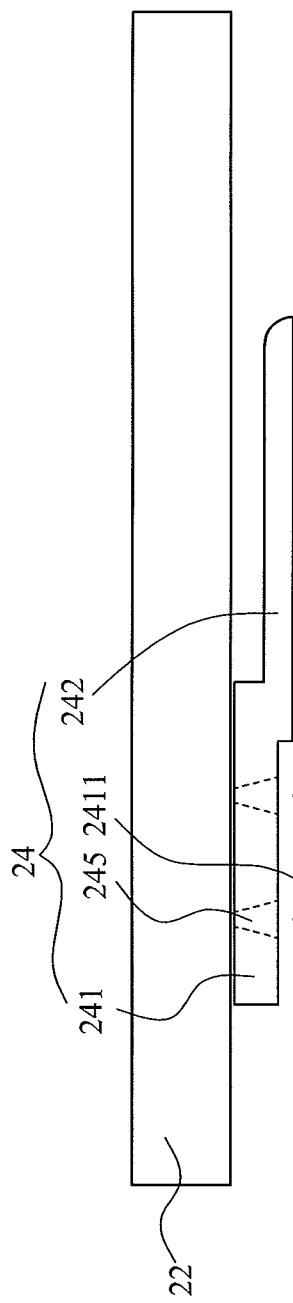
Figure 15:
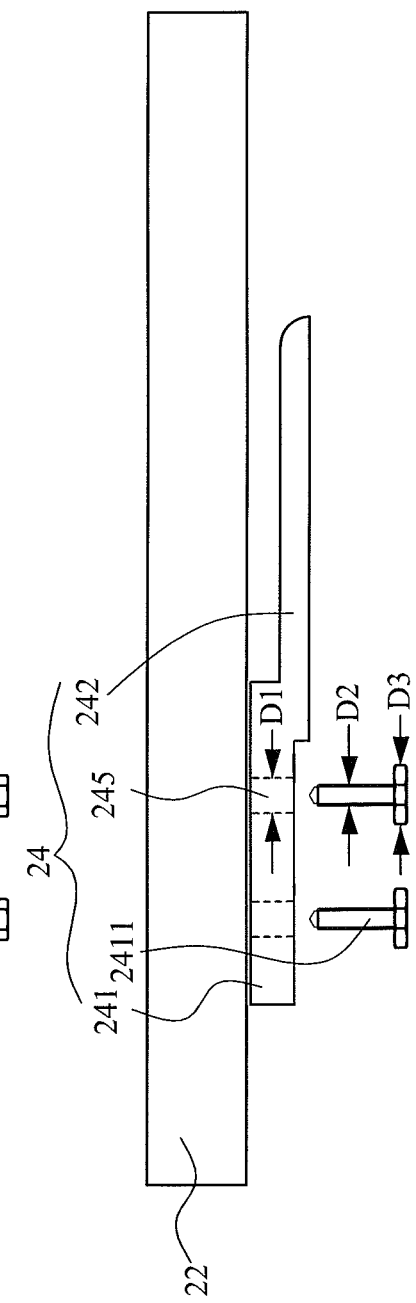

In some other embodiments, the receiving room 245 may be cone shaped (FIG. 14), inverse cone shaped (FIGS. 13A~43C) or cylinder shaped (FIG. 15).

As shown in FIG. 15, the receiving room 245 has a diameter D1. The fastening member 2411 has a diameter D2 in the body and a diameter D3 in the head. The equation of D3>D1>D2 is satisfied. Thus, the body of the fastening member 2411 may pass through the receiving room 245, and the head of the fastening member 2411 may be blocked at the outer side of the receiving room 245.

<9$^{th}$ Embodiment>

As shown in FIGS. 16A~16B, if the fitting 23 is secured with the wedge 24, the locking pin 232 will be disposed in the slot 243. In a preferable embodiment, the locking pin 232 is clamped by two branches of the fork 242. Thus, the locking pin 232 is disposed in the slot 243 by a tightly-fit manner, which is available for a metal wedge. In another embodiment, the locking pin 232 and two branches of the fork 242 may be disposed in the slot 243 by a loose manner, which is available for flexible materials such as plastic, resin, wood, etc. In other embodiments, each branch of the fork 242 may contain at least one fastening device 246 disposed anywhere on the branch, so that two branches of the fork 242 may be firmly fixed to the second board 22 without flexing. The fastening device 246, being a through hole in this case, is disposed at the tip 242B end of the fork 242 and could be a hook, tenon or other configuration instead. Because the fitting suite of this embodiment may provide far greater mechanical strength between the wedge 24 and the second board 22, it may as a result be utilized in large and heavy configurations such as immovable machinery (e.g. structural steel, bridge pier, building structure, etc.) or mobile machinery (e.g. ship, flying machine, vehicle, etc.)

<10$^{th}$~17$^{th}$ Embodiment>

As shown in FIG. 17 and FIG. 18, the tip 242B of each branch of the fork 242 comprises a leading angle θ, to improve assembling of the wedge 24 and the fitting 23. The fork 242 includes a plurality of first matching elements 247 arranged in a straight line and periodically disposed at each branch of the fork 242, with the first matching elements 247 being arc-shaped and protruded from each branch of the fork 242. However, the first matching elements 247 might also be a concave structure. The first matching elements 247 of the distinct branches all engage with the locking pin 232. Thus, the first matching elements 247 may consecutively touch the locking pin. The width D4 of each first matching element 247 is smaller than or equal to the diameter of the locking pin 232. In this manner, when the fitting 23 and the locking pin 232 moved leftward, the locking pin 232 will be subjected to several consecutive and tiny resistances by the first matching elements 247. Therefore, the locking pin 232 is free space adjustable to any location.

As shown in FIG. 19, the distance between the first matching elements 247 of the distinct branch is gradually shrunk. Namely, a V-shape is formed between two branches of the fork 242. In this manner, the fitting 23 is subjected to more resistance when moved leftward.

As shown in FIG. 20, the fork 242 has no first matching element 247. Besides, the distance between two branches of the fork 242 is gradually shrunk.

As shown in FIG. 21, the fork 242 may further have a notch 248 disposed at the root 242A, so that the locking pin 232 may be contained and restricted in the notch 248.

Figure 23:
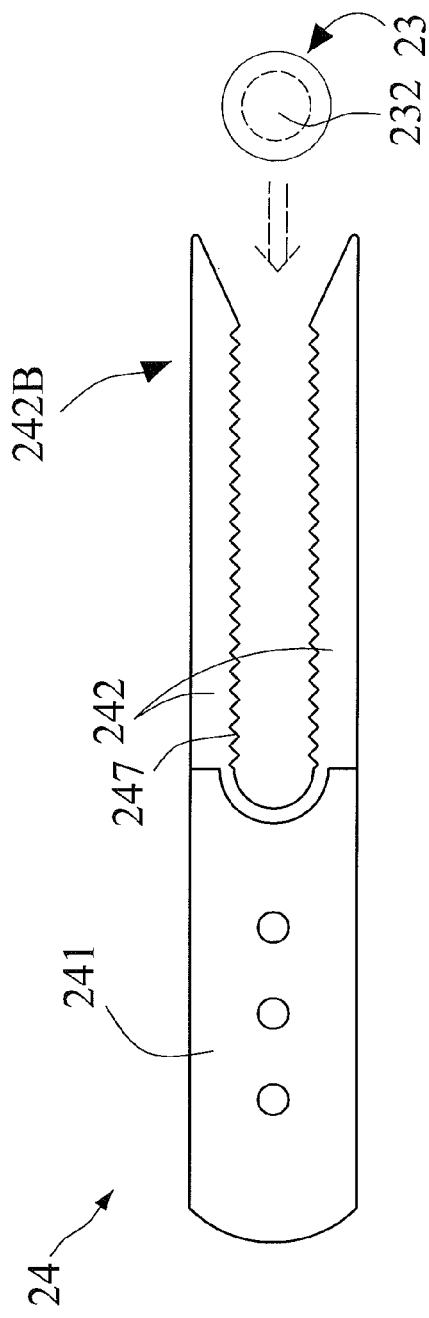
FIG. 23 is a schematic diagram for the 16$^{th}$ embodiment of the present invention.

As shown in FIGS. 22~23, the periodical first matching elements 247 disposed at each branch of the fork 242 are zig-zag shape (i.e. triangle shaped). The width D5 of each first matching element 247 is smaller than or equal to the diameter of the locking pin 232. Comparing FIG. 22 and FIG. 23, the first matching elements 247 between two branches are collocated with different diameters of locking pins 232. Thus, the fork 242 in FIG. 22 may match with the locking pin 232 by a smaller diameter than the locking pin 232 in FIG. 23.

Figure 24:
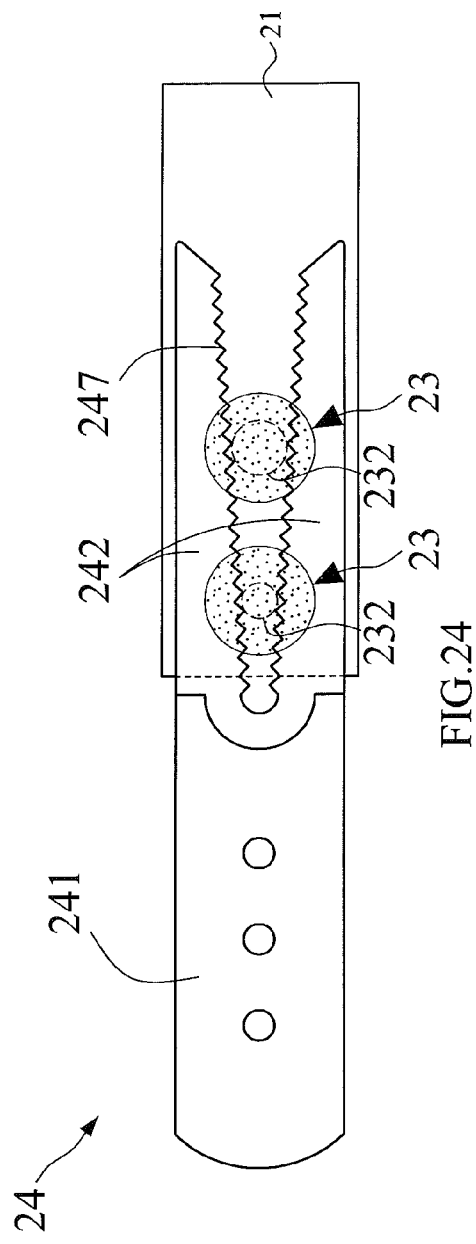
FIG. 24 is a schematic diagram for the 17$^{th}$ embodiment of the present invention.

As shown in FIG. 24, the fork 242 has a plurality of first matching elements 247 arranged in a V-shape. The first board 21 has two distinct fittings 23. One locking pin 232 (in the left) has a smaller diameter than another locking pin 232 (in the right). In this manner, two locking pins 232 are simultaneously and respectively matched with the first matching elements 247 by the periphery of the locking pins 232. In a word, the gradually shrunk distance between two branches of the fork 242 may match with the locking pins 232 by different diameters. Thus, two branches of the fork 242 are simultaneously engaged with two locking pins 232.

<18$^{th}$~24$^{th}$ Embodiments>

Figure 25:
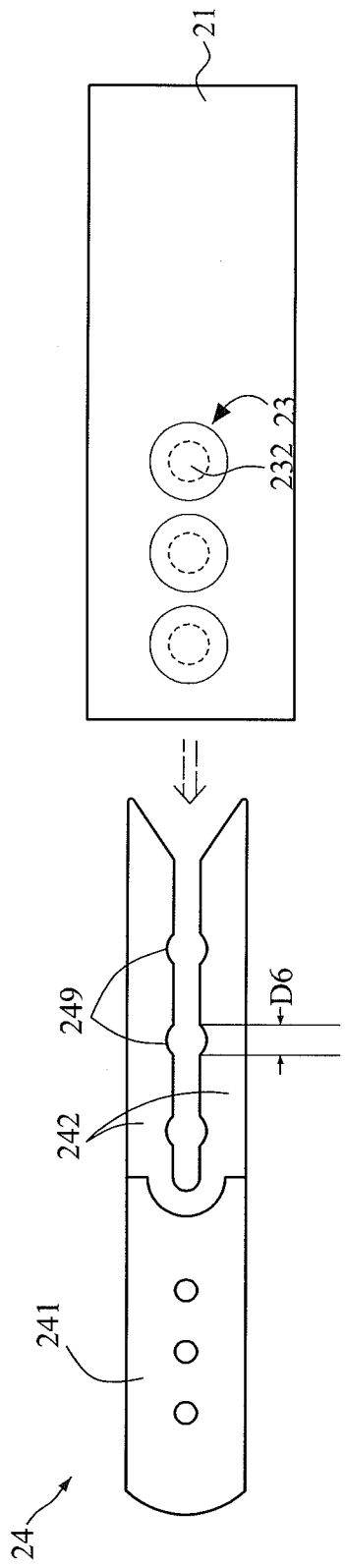
FIG. 25 is a schematic diagram for the 18$^{th}$ embodiment of the present invention.
Figure 26:
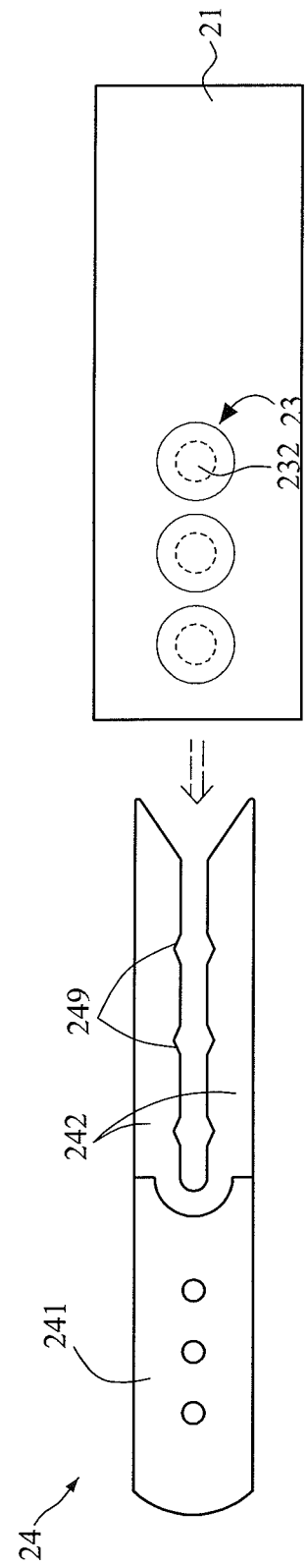
FIG. 26 is a schematic diagram for the 19$^{th}$ embodiment of the present invention.

As shown in FIG. 25~26, the fitting suite has a wedge 24 and three fittings 23, with the fittings 23 firmly fixed on the first board 21. Each branch of the fork 242 has three second matching elements 249 disposed at a side. The second matching elements 249 at one branch may correspond to the second matching elements 249 at another branch, and all of the second matching elements 249 are concave-shape, so that the second matching elements 249 of distinct branches are capable of receiving and matching with the locking pins 232 simultaneously. In a preferable embodiment, the second matching elements 249 are concave structures, and the number of the fitting 23 is equal to the number of the second matching element 249 of each branch. When the fittings 23 and the first board 21 are moved leftward, three fittings 23 can be restricted and confined within the second matching elements 249. In another embodiment, more second matching elements 249 may be disposed at each branch of the fork 242, so that the fittings 23 can be selectively confined at different locations.

In other words, when the first board 21 and the fittings 23 move leftward, three locking pins 232 can be matched with and thus disposed at the second matching elements 249. Therefore, the fastening force or combination strength is greater than previous embodiments due to more fittings 23 of disposition. The second matching elements 249 may be arc-shaped (FIG. 25) or triangle shaped (FIG. 26), and all second matching elements 249 are concave-shape to receive the locking pin 232. Moreover, the width D6 of the second matching element 249 is greater than or equal to the diameter of the locking pin 232.

As shown in FIG. 27, the second matching elements 249 at different branches may be interlaced (i.e. crossed arrangement); namely, the second matching elements 249 disposed at one branch do not correspond to the second matching elements 249 disposed at another branch. Additionally, the number of the second matching elements 249 in each branch can be greater than the number of the fitting 23.

As shown in FIG. 28, second matching elements 249 are only disposed at one branch of the fork 242.

Figures 29, 30:
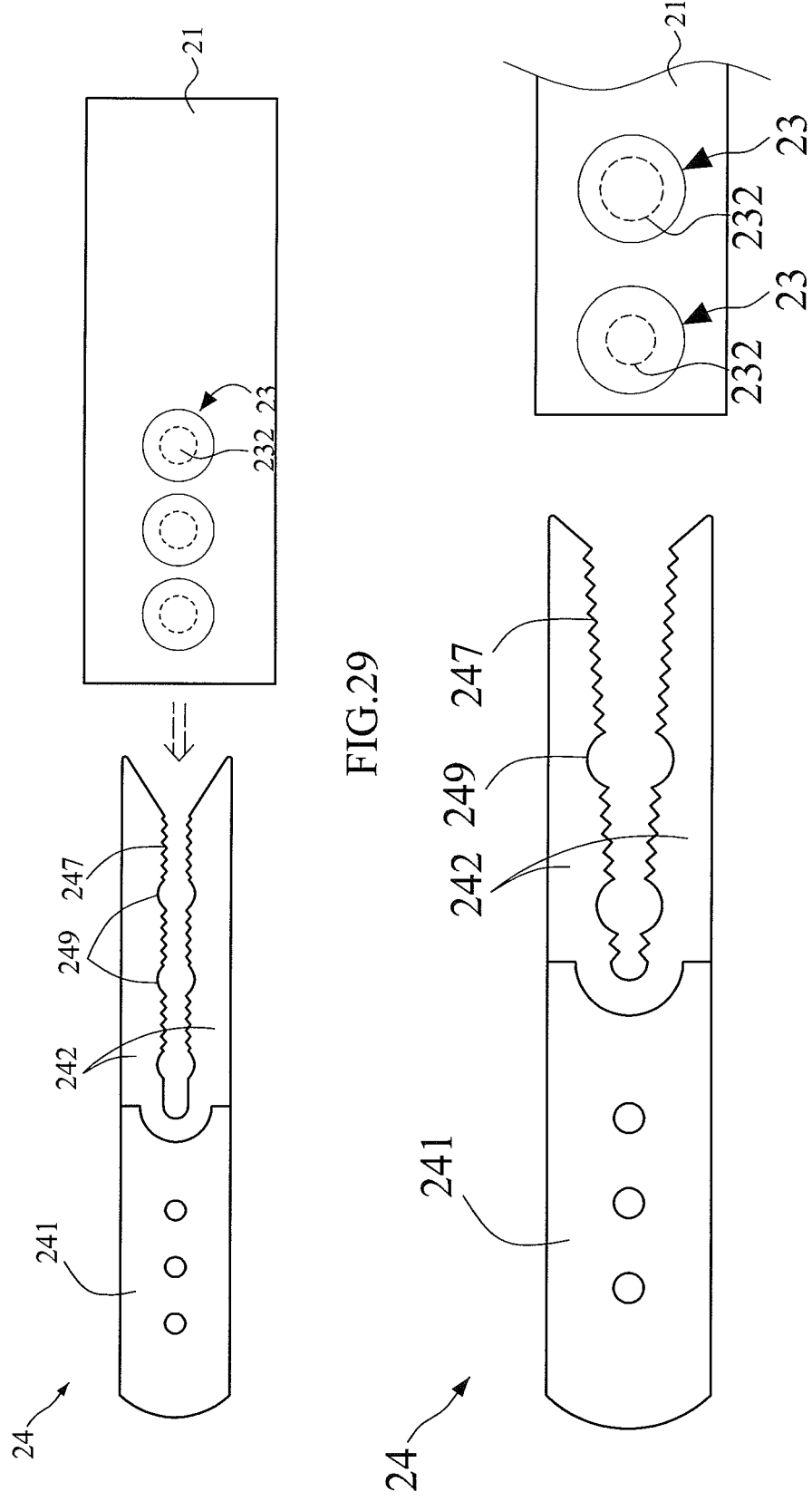
FIG. 29 is a schematic diagram for the 22$^{nd}$ embodiment of the present invention.
FIG. 30 is a schematic diagram for the 23$^{rd}$ embodiment of the present invention.

As shown in FIG. 29, each branch of the fork 242 has a plurality of first matching elements 247 and a plurality of second matching elements 249. The first matching elements 247 play the role of rendering some tiny and consecutive resisting forces on the locking pin 232 when the first board 21 and the fittings 23 move leftward, and the second matching elements 249 play the role of receiving the locking pin 232 when three locking pins 232 correspond to three second matching elements 249.

As shown in FIG. 30, the first matching elements 247 are arranged in a V-shape, and the second matching elements 249 are also arranged in a V-shape. In this manner, the second matching elements 249 may correspond to different diameters of the locking pin 232.

Figure 31:
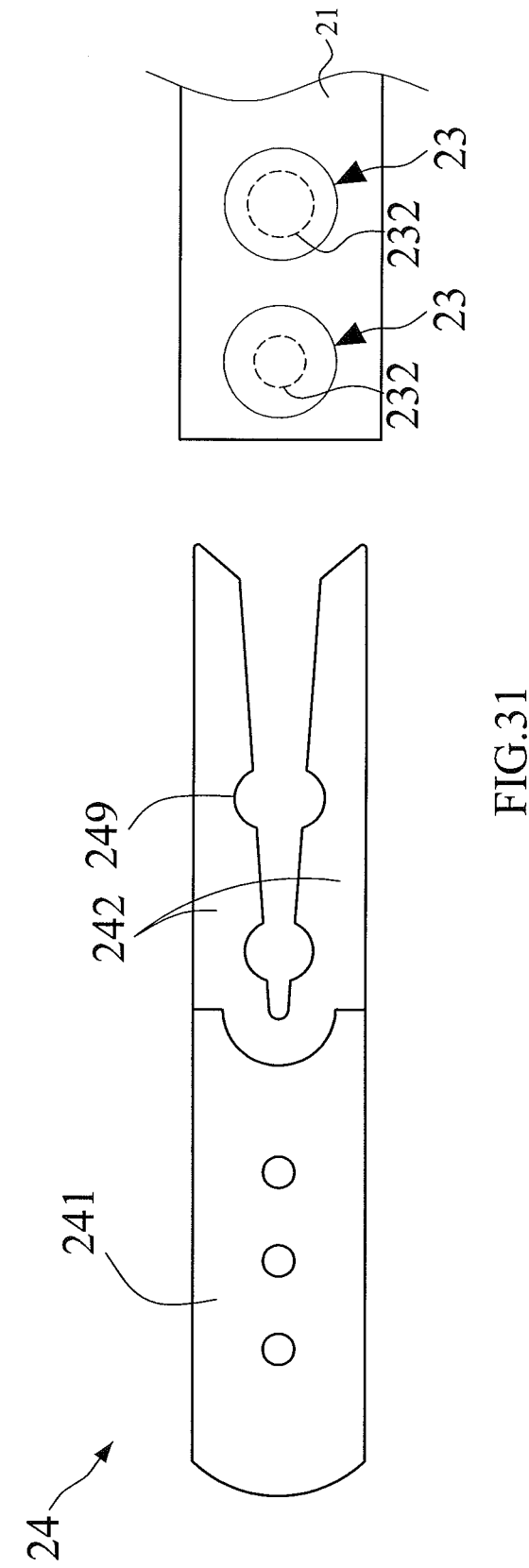
FIG. 31 is a schematic diagram for the 24$^{th}$ embodiment of the present invention.

As shown in FIG. 31, the fork 242 has the second matching elements 249 arranged in a V-shape, but does not have the first matching element 247. Besides, the distance between the second matching elements 249 of the distinct branch is gradually shrunk.

Summarily, the fitting suite for connecting the first board and the second board according to the present invention comprises a wedge and at least one fitting, in which the wedge and the fitting are easily and rapidly detachable. In this manner, the fitting suite may conveniently facilitate assembling or dissembling for many appliances in daily life, such as toy structures, composite closets, cabinets, combination houses, mechanical assemblies, wooden interior decorations or composite furniture. Thus, these mechanical composite structures may be subjected to several times to assembly or disassembly and without loosening their components. Thus, reliability and stability of these mechanical composite structures are improved.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

I claim:

1. A fitting suite for connecting a first board and a second board, comprising:
a fitting having a locking pin coupled with the first board and a fitting head spaced from the first board;
a fastening member having a head and a generally cylindrical fastening body; and
a wedge having a mounting coupled with the second board and a fork spaced from the second board, wherein the fork is detachably secured with the fitting head touched by the fork and the second board and the fork touched by the fitting head and the first board, wherein the fitting head exerts friction on both of the fork and the second board, wherein the fork exerts friction on both of the fitting head and the first board, wherein the mounting has a first surface, a second surface opposite to the first surface and at least one receiving room extending between the first and second surfaces to receive the generally cylindrical fastening body of the fastening member and to accommodate the fastening body of the fastening member fastened onto the second board, with the head of the fastening member being blocked by the mounting; and wherein cross sections of the receiving room parallel to the first surface are greater in diametric extent than cross sections of the body of the fastening member parallel to the cross sections of the receiving room parallel to the first surface and are smaller in diametric extent than the cross section of the head of the fastening member parallel to the cross section of the receiving room parallel to the first surface when the body of the fastening member is fastened onto the second board, with the diametric extent of the cross sections of the receiving room parallel to the first surface increasing between the first and second surfaces such that the receiving room has an enclosed space between the head, fastening body and mounting containing and restricting generated saw dust.

2. The fitting suite of claim 1, wherein a distance between two branches of the fork is gradually shrunk.

3. The fitting suite of claim 1, wherein the fitting head is selectively touched to a root of the fork.

4. The fitting suite of claim 1, wherein the wedge has a recess adjacent to a root of the fork and receiving the fitting head; and wherein the fitting head is selectively touched to the recess.

5. The fitting suite of claim 1, wherein the first board comprises a lateral groove to receive the fitting, or the second board comprises a lateral groove to receive the wedge.

6. The fitting suite of claim 1, wherein the fork includes a plurality of matching elements periodically disposed at each branch of the fork; and wherein the matching elements of distinct branches engage with the locking pin.

7. The fitting suite of claim 6, wherein a width of the matching element is smaller than or equal to a diameter of the locking pin.

8. The fitting suite of claim 6, wherein a distance between the matching elements of distinct branches is gradually shrunk.

9. The fitting suite of claim 1, wherein the fitting comprises a plurality of fittings, wherein diameters of distinct locking pins are unequal;
and wherein two branches of the fork simultaneously engage with the locking pins of the plurality of fittings.

10. The fitting suite of claim 1, wherein the fork has an equal number or greater number of matching elements compared with a number of the fitting; and wherein each matching element is disposed on at least one branch of the fork to selectively match with the locking pin.

11. The fitting suite of claim 10, wherein a width of each matching element is greater than or equal to a diameter of the locking pin.

12. The fitting suite of claim 10, wherein each branch of the fork has a plurality of matching elements, and wherein the plurality of matching elements on the distinct branch of the fork are interlaced.

13. The fitting suite of claim 10, wherein each branch of the fork has a plurality of matching elements, and wherein a distance between the plurality of matching elements of the distinct branch is gradually shrunk.

14. The fitting suite of claim 1, wherein each branch of the fork comprises at least one fastening device disposed thereon to make the branch couple to the second board.

15. The fitting suite of claim 1, wherein a tip of each branch of the fork has a free end thinner than a root of the branch of the fork.

16. The fitting suite of claim 1, wherein the fork comprises either at least one matching element on a branch of the fork with a concave-shape to receive the locking pin or a plurality of matching elements on the branch of the fork with arranged in a straight line to consecutively touch the locking pin.

17. The fitting suite of claim 1, wherein the first surface touches the second board.

18. The fitting suite of claim 1, wherein the second surface touches the second board.

19. The fitting suite of claim 1, wherein a tip of each branch of the fork has a leading angle to facilitate fastening with the fitting head.

20. The fitting suite of claim 19, wherein the tip of each branch of the fork has decreasing spacing from the second board with decreasing spacing from the mounting.

* * * * *